United States Patent
Kobayashi

(10) Patent No.: US 8,514,331 B2
(45) Date of Patent: Aug. 20, 2013

(54) DE-ROTATION ADAPTOR AND METHOD FOR ENABLING INTERFACE OF HANDHELD MULTI-MEDIA DEVICE WITH EXTERNAL DISPLAY

(75) Inventor: Osamu Kobayashi, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 85 days.

(21) Appl. No.: 13/114,759

(22) Filed: May 24, 2011

(65) Prior Publication Data

US 2011/0298982 A1   Dec. 8, 2011

Related U.S. Application Data

(60) Provisional application No. 61/352,753, filed on Jun. 8, 2010, provisional application No. 61/364,741, filed on Jul. 15, 2010, provisional application No. 61/366,865, filed on Jul. 22, 2010.

(51) Int. Cl.
*H04N 9/74* (2006.01)
*G06K 9/62* (2006.01)
*G06F 15/16* (2006.01)

(52) U.S. Cl.
USPC ............ 348/581; 348/583; 382/209; 709/218

(58) Field of Classification Search
None
See application file for complete search history.

(56) References Cited

U.S. PATENT DOCUMENTS

| 6,349,297 | B1 * | 2/2002 | Shaw et al. ........................... 1/1 |
| 7,068,686 | B2 | 6/2006 | Kobayashi |
| 2008/0317357 | A1 * | 12/2008 | Steinberg et al. ............. 382/209 |
| 2010/0060792 | A1 * | 3/2010 | Corlett et al. ................. 348/583 |

OTHER PUBLICATIONS

U.S. Appl. No. 61/352,753, filed Jun. 8, 2010.
U.S. Appl. No. 61/364,741, filed Jul. 15, 2010.
U.S. Appl. No. 61/366,865, filed Jul. 22, 2010.

* cited by examiner

*Primary Examiner* — Jefferey Harold
*Assistant Examiner* — Sean Haiem
(74) *Attorney, Agent, or Firm* — Beyer Law Group LLP

(57) ABSTRACT

Methods, systems and circuit elements that enable improved interface between a source electronic devices that generate rotatable image frames and an external sink device. In particular, aspects of the invention enable image de-rotation and/or improved speed in horizontal and V-scaling of image data supplied to an external sink device.

31 Claims, 15 Drawing Sheets

DE-ROTATION ADAPTOR AND METHOD FOR ENABLING INTERFACE OF HANDHELD MULTI-MEDIA DEVICE WITH EXTERNAL DISPLAY

CROSS REFERENCE TO RELATED APPLICATIONS

This patent application takes priority under 35 U.S.C. 119 (e) to U.S. Provisional Patent Application No. 61/352,753 filed on Jun. 8, 2010, entitled "IMAGE ROTATION SUPPORT" by Kobayashi; Provisional Patent Application No. 61/364,741 filed on Jul. 15, 2010, entitled "METHOD AND APPARATUS FOR DE-ROTATION AND SCALING OF VIDEO DISPLAY DATA" by Kobayashi; and Provisional Patent Application No. 61/366,865 filed on Jul. 22, 2010, entitled "OPTIMIZING THE IMAGE DE-ROTATION AND HORIZONTAL/VERTICAL SCALING OPERATIONS" by Kobayashi, all of which are hereby incorporated by reference herein in their entirety.

TECHNICAL FIELD

The present invention relates generally to communication methodologies and systems connecting source devices to external sink devices using an adaptor enabling image de-rotation and horizontal and vertical scaling. Supporting methods, systems, and integrated circuit devices are also described.

BACKGROUND OF THE INVENTION

Handheld electronic devices have become ubiquitous features of everyday life. Additionally, the capabilities of these devices have vastly increased in recent years. Typical examples of such devices are hand-held communication devices (such mobile telephones and so-called smart phones), personal digital assistants (PDA's), hand-held GPS and navigation systems, hand-held game console's, e-book readers, compact computing devices, video cameras, still cameras, and a vast array of other small electronic devices having view screens. It is particularly noted that the enumerated devices present convenient examples and that the invention should not be construed as being limited to these specific devices.

Increasingly many of these devices enable multi-media sourcing capabilities. In particular, many such devices are configured to enable video and/or image data to be provided to external devices. Conveniently, many such hand-held devices include features that rotate the displayed images depending on the viewing orientation used. Thus, the viewing orientation of the displayed image can be rotated depending on the viewing position of the user.

Additionally, it is becoming common to port these devices into other display devices, for example, desktop displays. Such hand held devices have some attributes that make such cross over to other displays a slightly more complicated endeavor.

As is known, an image frame comprises a set of pixels arranged in an array of rows and columns. Each frame having a width defined by the number of pixels in each horizontal row of pixels. The height is defined by the number of rows in each frame. Additionally, devices can display these images in so-called portrait and landscape viewing orientations. The formats display the images at right angles from each other. In one example, a "landscape" orientation (i.e., the screen is arranged having more y pixels than x pixels) of a hand-held display screen has a height to width ratio of less than 1, for example, a shown in FIG. 1(a). The image 101 is displayed in a landscape format. Other alternatives can use a default "portrait" orientation where the internal display screen is arranged having more x pixels than y pixels. Thus, having a height to width ratio of greater than 1. By way of example, FIG. 2(b) provides a portrait view of a similar image.

In the example of FIG. 1(a), a "raster scan" type of image reconstruction process can be used for an example display such as that of FIG. 1(b) showing a simplified expression of the process. For example, the image is displayed by scanning the image data from left to right 103 and from top to bottom starting in the upper left hand corner 102. The bottom row is scanned last.

When the display device uses a "landscape" view as the default, rotating the screen causes the image to tilt sideways. To correct this problem, many mobile or handheld devices have a rotation feature that compensates for this problem. Hence, and when the device is rotated, the image orientation changes to accommodate the rotation. For example, if the screen is rotated clock-wise 105 (see, FIG. 2(a)). Responsively, the depicted image is corrected by a counter-clockwise rotation 106 (see, FIG. 2(b)) to present a rendering image 111 that is viewable with a corrected orientation.

This works well when the image is viewed on the device screen. However, when the device is used as a source for an external display, this feature causes some problems. Due to the nature of the "raster scan" process, an incorrect image is generated when rendered on an external display.

For example, FIG. 2(c) illustrates how the image will be written from a handheld device (such as the image of FIG. 2(b)). The ordinary raster scanning process of the source works as before, scanning left to right. The problem is that the upper left 102 of the physical source screen was been rotates and now comprises the upper right 202 (of FIG. 2(c)) of the screen. This is problematic for a fixed default external display because the source process still scans from the source screen left to right. Accordingly, after rotation the scan process now proceeds from top to bottom progressing from right to left. This has the anticipated consequence, as illustrated in FIG. 2(d). When the skewed source data is received by the external display 211 and it is written across 213 the display screen in the usual fashion (raster scanned from upper left to upper right, then moving down a row and repeating). However, the pixels so scanned are oriented at a right angle thus displaying, a rotated image 212 rendered on the external display.

Among the aspects of the invention are method and adaptor embodiments enabling counter-rotation (also referred to herein as de-rotation) of rotated source images to enable correct image rendering by an external sink device.

SUMMARY OF THE INVENTION

This invention describes embodiments suitable for receiving multimedia data (including image and video streams) and processing the data to enable image de-rotation and/or scaling of the data enabling it to be output to a sink device. Embodiments can comprise an adaptor device, electronic processing systems to include chip based electronic systems, methods, supporting software systems as well as other associated implementation modes.

In a first aspect, an embodiment of the invention comprises an adaptor. The adaptor enabling data transmission from a source device to an external display device. The adaptor is configured to de-rotate image data that has been rotated at the source such that it can be rendered as de-rotated image data at the external display device. In another approach the adaptor can be configured to enable scaling of image data. In another related embodiment, the adaptor is configured to achieve one or both de-rotation and scaling. In one such embodiment, the adaptor can employ a combination of SRAM and DRAM memory modules in conjunction with one or more scalers to enable high speed de-rotation and scaling of multimedia data.

In another aspect of the invention a computer chip system that enables image de-rotation and output to an external display is disclosed. In one embodiment, the chip system includes de-rotation circuitry configured with a pair of SRAM sub-frame memory elements configured to receive source image sub-frames which are processed and then forwarded to DRAM full frame memory elements that cooperatively operate to de-rotate and/or scale source data.

And in another aspect, the invention comprises a method of de-rotating and/or scaling source image data. In one such embodiment, the method involves receiving an image at an adaptor and determining if such image data requires de-rotation. Where said de-rotation is required, a portion of the image frame is read horizontally into an SRAM memory as an image sub-frame. Subsequently, the sub-frame is read out from the SRAM memory thereby creating a de-rotated sub-frame. A plurality of de-rotated sub-frames are horizontally read into a DRAM memory until the plurality of de-rotated sub-frames is captured in the DRAM memory. The DRAM memory is then output as a full de-rotated image frame.

General aspects of the invention include, but are not limited to methods, systems, apparatus, and computer program products for enabling multimedia data transmission in multimedia device networks. Aspects include improved dual-mode source devices and improved dual-mode adaptor connectors.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF PREFERRED EMBODIMENTS

Reference is made to particular embodiments of the invention. One example of which is illustrated in the accompanying drawings. While the invention will be described in conjunction with particular embodiments, it will be understood that it is not intended to limit the invention to the described embodiments. To the contrary, it is intended to cover alternatives, modifications, and equivalents as may be included within the spirit and scope of the invention as defined by the appended claims.

Among the aspects of the invention are methods, computer instruction sets, integrated circuit, and adaptor device embodiments enabling de-rotation of rotated image data provided by a source device. Moreover, aspects of the invention enable accelerated horizontal and vertical scaling of both de-rotated and non-rotated images. All enabling improved display of image data with external display devices.

Figure 3A:
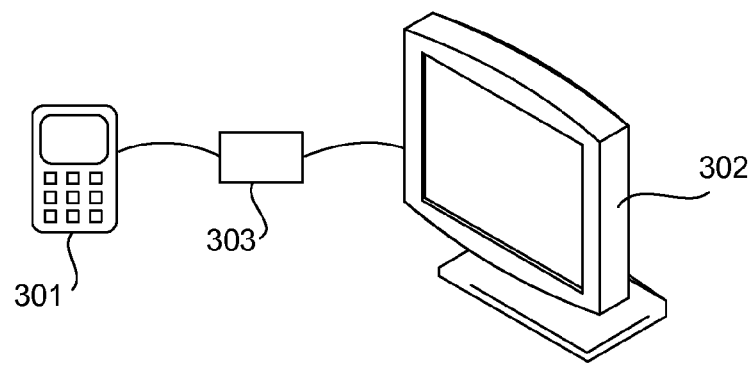
FIG. 3(a) diagrammatically illustrates a simplified network showing a connection of a source device with an external display via an adaptor in accordance with an embodiment of the present invention.

FIG. 3(a) illustrates one example system 300 embodiment. One such system comprises a de-rotation device 303 interposed in a link between a source 301 and sink device 302.

The source device 301 can be any source device capable of providing multi-media content. In particular, such source devices can be those devices capable of generating and transmitting rotatable source images. Particular examples can include, but are not limited to smart phones, personal electronic devices (e.g., PDA's and the like), tablet computer devices (e.g., iPads™, NetPads™, Nokia 770™, and the like), navigation devices, mobile computing devices, and so on. Although particularly well adapted to such devices, other source devices can include cameras, video recorders, game platforms (especially mobile game platforms), portable computers, cellular phones, music players, content capture and content generation devices, and many other such source devices beyond those referenced above.

The sink device 302 can be any sink device capable of receiving multi-media content. Such can include display devices, other hand-held devices, computers, or any other devices capable of receiving video or image data. Particularly sink devices can include, but are not limited to, computers, play stations, game consoles, stand alone display devices, desktop display devices, handheld electronic devices, routers, network based devices, and so on. Additional non-limiting examples include handheld devices capable of receiving image content (still images, video, and so on) e.g., smart phones, personal electronic devices (e.g., PDA's and the like), navigation devices, cameras, video recorders, game platforms (especially mobile game platforms), portable computers, cellular phones, music players, content capture and content generation devices, and many other such sink devices beyond those referenced above.

Multimedia content used in the system 300 generally refers to text, audio, still images, animation, video, and interactivity content, as well as other data. All such multimedia content can include integrated content, for example, video data and associated audio information. This definition is not intended to be limiting.

As indicated above, the adaptor 303 is coupled between both devices. For example, using a pair of interfaces. Such can be wireless connections but more commonly, physical connectors using standard type communication with appropriately configured interface connectors. Such physical communication links can include wires, fiber optic systems, as well as others. In one particular implementation such a wired connection can comprise a data channel having a main link channel and a sideband channel. In one implementation, a connector such as described by example in U.S. Pat. No. 7,068,686, issued Jun. 27, 2006, entitled "Method and Apparatus for Efficient Transmission of Multimedia Data Packets" naming Kobayashi as inventor can be used to establish a suitable connection. In another example, the connector interfaces can be those compatible with universal serial bus (USB) type connectors. Moreover, example interface possibilities include, but are not limited to, micro-USB connectors, or VESA (Versions 1.1, 1.2, etc.) compatible interfaces. As is readily appreciated by those of ordinary skill in the art many other connector configurations can be used. The interfaces 306, 304 (of FIG. 3(b)) can also comprise a transmitter, receiver, or transceiver to enable communication with the source 301 and sink 302.

In one particular implementation, the first primary data transmission format can comprise the widely known and used DisplayPort® format such as specified, for example, by the Video Electronics Standards Association (VESA) Versions 1.1, 1.2, (hereby incorporated by reference). As is known, this format includes a main link, with four data lanes for transmitting multimedia data, and a bi-directional half-duplex side band communication channel, comprising a pair of lines (AUX lines) that can carry supplementary data (i.e., device management and device control data) for the main link. Examples of such supplementary data includes, but not limited to link training information, content protection, EDID (Extended Display Identification Data), E-EDID (Enhanced EDID), DPMS (Display Power Management Signaling), MCCS (Monitor Command Control Set), HDCP (High-bandwidth Content Protection), DPCP (DisplayPort Content Protection) and wide range of other information.

Figure 3B:
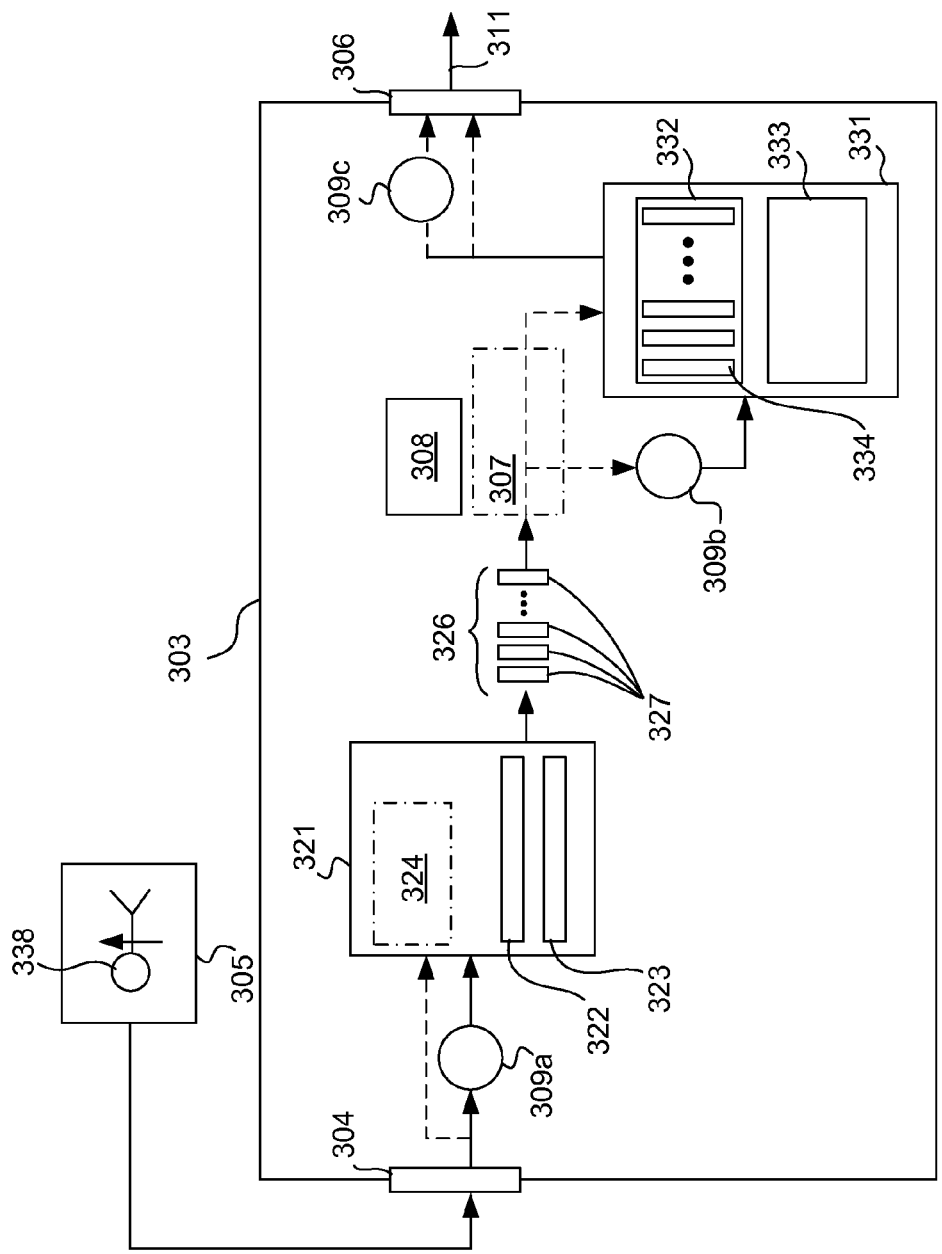
FIG. 3(b) is a block diagram of an adaptor embodiment enabling image de-rotation and generation of an output signal suitable for receipt by an external display device in accordance with an embodiment of the present invention. The embodiment further is described with respect to the implementation of horizontal and vertical scaling operations.

FIG. 3(b) is a block diagram illustrating one embodiment of such an adaptor 303. The adaptor generally includes an input interface 304, an output interface 306, a pair of memory modules 321, 331 (described in greater detail below), control circuitry 307 (e.g., a memory controller or other processor) configured to control the various adaptor systems, scalers (here any of 309a, 309b, 309c), and can include power systems 308 as well as a variety of other systems. In general, the various systems of the adaptor 303 can be embodied on a single integrated circuit chip, for example as system on a chip (SOC) configuration. Also, several interconnected separate chips can be used in such an adaptor system. In general, the system can be embodied in a wide range of form factors and configurations. Moreover, such a system can be configured to operate using software instructions or computer executable instructions embedded in firmware of the adaptor.

The input interface 304 is coupled (physically or wirelessly) with a multimedia source device 301 enabling the receipt of multimedia data 305 from the source 301. Output interface 306 is interconnected (physically or wirelessly) with a multimedia sink device 302 enabling the output and transmission of multimedia data to a sink device 302 (e.g., an external display).

The adaptor 303 is configured to receive image data and selectively de-rotate and/or scale image data as needed and then transmit the data to the external sink device 302 for display and/or further processing. In one such implementation the adaptor 303 can support the systems inside a housing which can be plastic, metal, composites, as well as other materials configured as necessary to couple the adaptor 303 in a link between the source device 301 and the sink device 302.

Figure 1A:
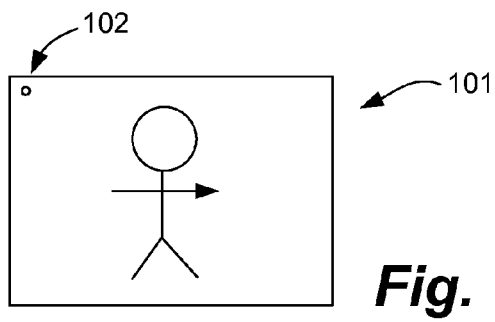
FIGS. 1(a), 1(b), and 2(a)-2(d) several implementations of image rotation and scanning using source devices such as handheld source devices and an external display device.
Figure 1B:
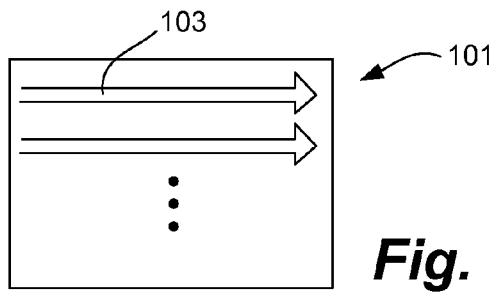
Figure 2A:
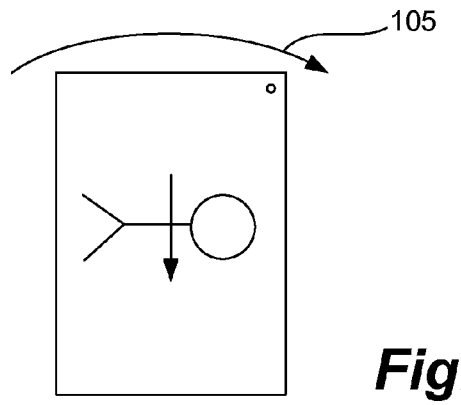
Figure 2B:
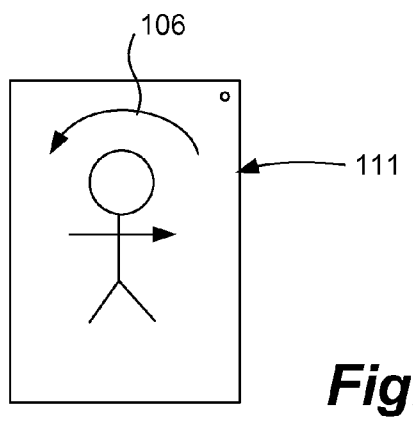
Figure 2C:
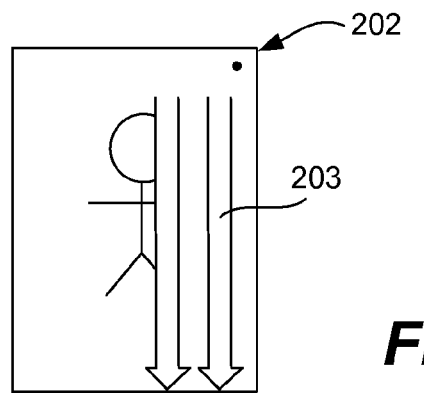
Figure 2D:
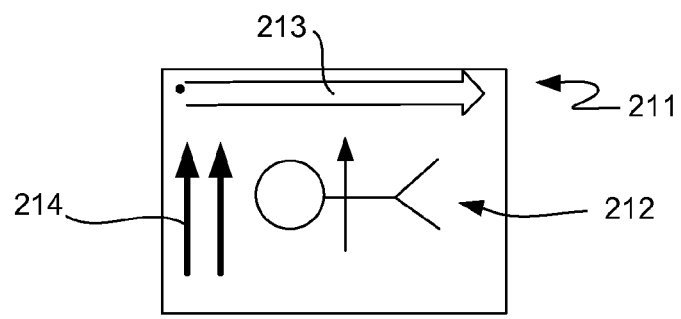

To continue with FIG. 3(b), image data 305 transmitted by source 301 is received 304 as a rotated image frame (i.e., the image is rotated to be viewed correctly at the source, but the raster scan presents the image 305 to the sink/adaptor in a rotated manner). For example, the image 305 orientation is similar to that of 211 of FIG. 2(b).

To briefly describe an aspect of the invention, the adaptor 303 includes a sub-frame memory module 321 and a full frame memory mode 331. In general, the sub-frame memory module 321 is configured to enable high speed data access in both vertical and horizontal data read operations. In contrast, memory elements of the full frame memory mode 331 need only enable high speed data access in one direction, for example, a high speed horizontal read operation. The function and architecture will be described in greater detail below. In one example embodiment, the sub-frame memory module 321 can be configured with SRAM memory elements and the full frame memory module 331 can be configured with DRAM memory elements.

The input interface 304 receives image data 305 which is read into sub-frame memory elements (e.g., 322, 323) of sub-frame memory module 321. In one implementation, the sub-frame memory module 321 uses only a pair of sub-frame memory elements 322, 323 to enable system functionality. Other implementations can use more than two such elements. To continue, the pair of sub-frame memory elements 322, 323 store portions of the input image frames 305.

Sub-frame memory elements 322, 323 are advantageously designed to be read out at high speed in either axis (i.e., either as horizontal rows or as vertical columns) rather than just one axis (e.g., like a SRAM memory device). In one embodiment, suitable sub-frame memory elements (322, 323) can be SRAM memory devices suitable for storing selected portions of the source image data 305. Among the many attributes of this memory configuration is the ability to write data to the memory in one axis (e.g., a rows of pixels) and enable rapid read out of the data in another axis (e.g., a perpendicular axis, for example, reading out columns of pixels rather than rows of pixels) thereby enabling rapid de-rotation of the stored image frame portions.

Also, an associated full frame module 331 is configured having simpler architecture that can enable lower cost memory devices to be used. For example, the full frame elements 332, 333 of full frame module 331 can be configured to enable high speed data read operations in only one axes (e.g., high speed read out only by horizontal pixel data rows). Such memory elements can comprise DRAM type memories.

To continue, where the memory elements 322, 323 of the sub-frame module 321 are configured as static random access memory (SRAM) elements, data can be written to or read out of the SRAM memory in either columns or rows with equal facility and speed. Thus, data that is written into the SRAM memory as horizontal data rows can be vertically read out from the memory at high speed and low data access time. In contrast, to read a single column of pixels, a DRAM memory is handicapped by the limitation that to access a pixel in a line it must re-initialize each after each line to access the pixels of each column. This must be done one pixel at a time, making for comparatively slow access times in a column read operation. Thus, unlike cheaper DRAM memories, SRAM elements do not have to reset a row address prior to setting a column address after each line to access the pixels of each column one by one. As a result, SRAM memory elements do not have the large timing overhead required for DRAM memory elements. However, as a practical matter, large size SRAM memories are prohibitively expensive. Accordingly, in one embodiment of the invention, a sub-frame memory module 321 includes a pair of smaller, less costly, SRAM sub-frame memory elements 322, 323 (that each hold only a portion of full frames) that work in conjunction with the full frame module 331 (capable of holding entire full frames) to enable de-rotation and/or high speed processing as well as other signal processing.

A trade off between cost and efficiency is important in the size of the sub-frame memories (322, 323). The sub-frame memory elements 322, 323 are x pixels wide with a finite number of rows y that define how many pixels in height each sub-frame will be. In one embodiment, the pixel width x of a sub-frame row can be the same width as that of the input image frame 305 and the height dimension y can be 8 pixels in height. The invention is not limited to this memory size, but such a sub-frame memory size provides a good trade-off between cost and efficiency. Thus, in one example, a sub-frame buffer can be sized to hold an image sub-frame having a horizontal width of about 1024 pixels and vertical height of about 8 pixels. The row width is generally whatever length is necessary to accommodate the introduction of whatever input data is supplied and such that it enables de-rotation of entire image frames and the sub-frame memory height can be any height desired by the designer, but in general, cost versus performance considerations dictate the height.

As stated, full frame module 331 comprises pair of full frame memory elements 332, 333 sized to hold full image frames (e.g., 305). Typically, the full frame memory elements 332, 333 are configured as standard DRAM memory elements. The two modules 321, 331 operate cooperatively to, for example, enable de-rotation and/or scaling of frames by the adaptor 303.

In one example process, image data (e.g., image frame 305) is received at the adaptor 303 from a source device 301 Also, information concerning the source images, source device operational capabilities, and the external device operational capabilities is received by the adaptor 303. The adaptor controller 307 can interpret this information to enable the adaptor to configure input data into a form suitable for receipt by the sink device 302 and/or other adaptor operations.

Briefly, this ancillary information can comprise a wide variety of source and display operational parameters and are discussed in some detail elsewhere in this specification. For example, such ancillary information can comprise parametric information characterizing the source and sink display parameters. Examples include, but are not limited to parameters such as those described with respect to FIG. 7. Such information is generally received through the link between the adaptor and the source/display devices. For example, using a sideband channel of the link. One piece of particularly useful information provided by the source is the rotation status of the input image data 305. Others can include external display capabilities as well as other image data.

To continue, an image frame 305 is received (typically through input interface 304) at the sub-frame memory module 321 where horizontal portions (slices or strips) of the image frame 305 are horizontally written to the SRAM sub-frame memory elements 322, 323 as a series of data rows to form image sub-frames 326 in the sub-frame elements 322, 323. The sub-frames 326 are a series of data rows that comprise a slice of the larger image frame 305.

Once read into the sub-frame elements 322, 323, the sub-frames 326 are then read out as needed. Importantly, to effectuate de-rotation, in contrast to the horizontal write in operation, the sub-frames 326 are vertically read out from the sub-frame memory elements 322, 323 in a series of short columns (schematically represented here by columns 327). The sub-frames 326 can be read directly into the full frame memory elements 332, 333 or into a scaler 309b and then into the full frame memory elements 332, 333 (depending on a processing implementation). In one embodiment, the plurality of short columns 327 (making up the sub-frame 326 output from module 321) are horizontally written into the full frame memory elements 332, 333 of the full frame module 331 to form a vertical sub-frame strip 334 in the associated full frame memory. In general usage, a series of adjacent vertical sub-frame data strips 334 are written, one after another, to the full frame memory elements 332, 333. As is to be expected, the "height" of the columns 327 is the same as the number of rows in the sub-frame elements 322, 323. Importantly, the height of the columns 327 is now transposed into a width for each of the vertical sub-frame strips 334 as the columns are horizontally written to the full frame memory elements 332, 333. In other words, the width of the vertical sub-frame data strips 334 is the number of rows in a sub-frame.

These vertical sub-frame data strips 334 are written into the full frame memory elements (332, 333) until the full input image 305 is written to the full frame memory elements (332, 333). In other words the plurality of sub-frames are accumulated in one of the full frame memory elements (332, 333) until the full image frame is formed in a respective one of the full frame memory elements (332, 333). At which point the accumulated full frame can be read out as a de-rotated image frame and delivered to an external device (e.g., an external display 302). In later described implementations this full frame read out can be processed by scaler 309c as described below.

In an alternative, or optional process, the sub-frames 326 can be read from the sub-frame memory elements 322, 323 to a scaler 309b that can process the short columns 327 to enable scaling on these short pieces 327. As the columns comprise a meaningful height, a reasonable degree of vertical scaling can be performed on the columns 327 before they are written to the full frame memory elements 332, 333. For example, where an 8 row sub-frame element 322 is used, scaling can be used to scale each 8 row column 327 which provides enough pixels to support a reasonable degree of scaling. Some aspects of this approach will be further detailed elsewhere in this patent.

It is worth pointing out that the sub-frame module 321 can include a sub-processor 324 configured to receive image data (e.g., image frames 305) and process them to generate image sub-frames. It should be pointed out that this processor 324 can operate as a stand alone module or operate as part of the sub-frame module 321, or be integrated into other components (e.g., the controller 307). Additionally, the controller 307 can simply be configured to control and regulate the entry of input data 305 into the sub-frame elements 321, 322.

Also, many adaptor embodiments can employ one or more scalers (schematically represented by 309a, 309b, 309c) enabling the image data to be scaled for display by the external display. However, the scalers are not essential to all embodiments.

An example mode of operation is described with reference to FIGS. 3(b) & 4(a). A rotated image frame 305 (in this case, rotated 90°) is received from a source device 301 at the adaptor 303 system. The controller 307 also receives information from the source 301 enabling it to determine that the image has been rotated in one of 0°, 90°, 180°, & 270°.

Using the present example (where the input image is rotated 90° such as shown by image 305) horizontal portions of the rotated image 305 are written into the sub-frame memory elements 322, 323 in alternating fashion. In other words, a first sub-frame is written to a first sub-frame memory element, then a second sub-frame is written to a second sub-frame memory element, then a third sub-frame is written to the first sub-frame memory element (after the first sub-frame has been evacuated from the first sub-frame memory), and so on. To tie it to a specific example, in FIG. 4(a), a first portion 401 (first slice) N of the rotated image 305 is horizontally written (e.g., from left to right) to a first sub-frame memory 323. Followed by a second portion 402 (second slice) N+1 which is horizontally written to second sub-frame memory 322. As the second slice N+1 (402) is being written into the second sub-frame memory 322, the first slice N (401) is being read out from the first sub-frame memory 323 in a manner described below. To continue, after the first sub-frame memory 323 is vacated (or in some embodiments, as the memory is being vacated) a new frame N+2 (403) is written to the first sub-frame memory 323.

In one specific example, a sub-frame (e.g., a first sub-frame N (401)), comprises a slice (or strip) of the image frame 305 sized 8 rows high and x pixels long. Here, x is the number or pixels long of the sub-frame memory element (e.g., 323). It is preferable that sub-frame memory element be at least as wide as the image frame.

The process continues as a sequential process, thus, a second portion 402 of the image 305 comprising another sub-frame (N+1) 402, is horizontally written to a second sub-frame memory element 322. This sub-frame (N+1) 402 also comprises 8 rows, each, x pixels long. The sub-frame memory elements 322, 323 can operate so that as sub-frame N+1 is being horizontally written to the second sub-frame memory element 322, the first sub-frame N can be vertically read out from the first sub-frame memory element 323 as a stream of short vertical columns (M, M+1, M+2, . . . M+z) as depicted in 327 of FIG. 3(b).

Additionally, and importantly, a next step in such processing enables de-rotation if desired. Once the sub-frames are vertically read out of the sub-frame memories (322, 323) the component vertical columns (M, M+1, M+2, . . . M+z) are then horizontally written to the full frame memory elements of the full frame memory module 331. For example, as sub-frame N (401) is vertically read out of sub-frame memory 323, it is also being horizontally written to the first full frame memory element 333 as series of short, now horizontal, rows (also identified in this drawing as M, M+1, M+2, . . . M+z) that each define only a portion of the width of the final output full frame. This process is continued with each sub-frame memory element being written to as the other is read out. So the process goes, stepping downward across the input image frame 305. Thus, an alternating sequence of horizontal writing to and vertical reading out of the sub-frame memory elements proceeds as the adaptor works its way through the image frame 305 to generate a stream of sub-frames.

In one example, this process can be facilitated by an image processor 324 (e.g., as shown in FIG. 3(b)) or, alternatively, using the controller 307. A typical sub-frame module 321 can be facilitated by a wide range of electronic circuits and devices. As digital signal processor or other ASIC (application specific integrated circuit) can be used, as can be FPGA's, CPLD's and so on.

As indicated above, de-rotation of image frames can be accomplished by the vertical read out process briefly touched upon above. The system is configured to vertically read the data out of the sub-frame memory elements. A process which, in one embodiment, is made vastly faster by using an SRAM memory device in sub-frame elements 322, 323. The SRAM vertical read out mode depicted here is substantially faster than what could be accomplished using a vertical read out from a DRAM memory element.

Figure 4A:
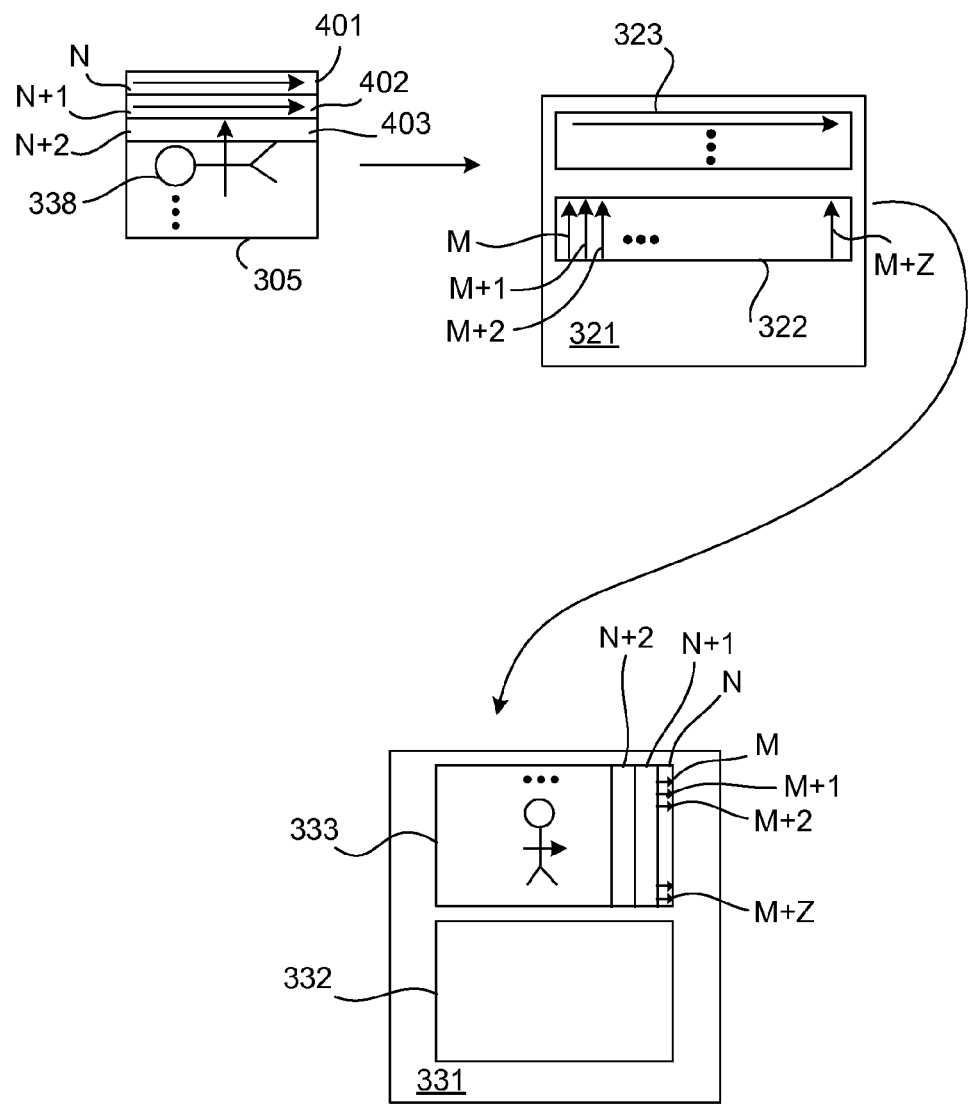
FIGS. 4(a)-4(d) diagrammatically illustrate operational aspects of a relationship between a sub-frame module and a full frame module in various embodiments of the invention configured to enable image de-rotation in accordance with the principles of the present invention.
Figure 4B:
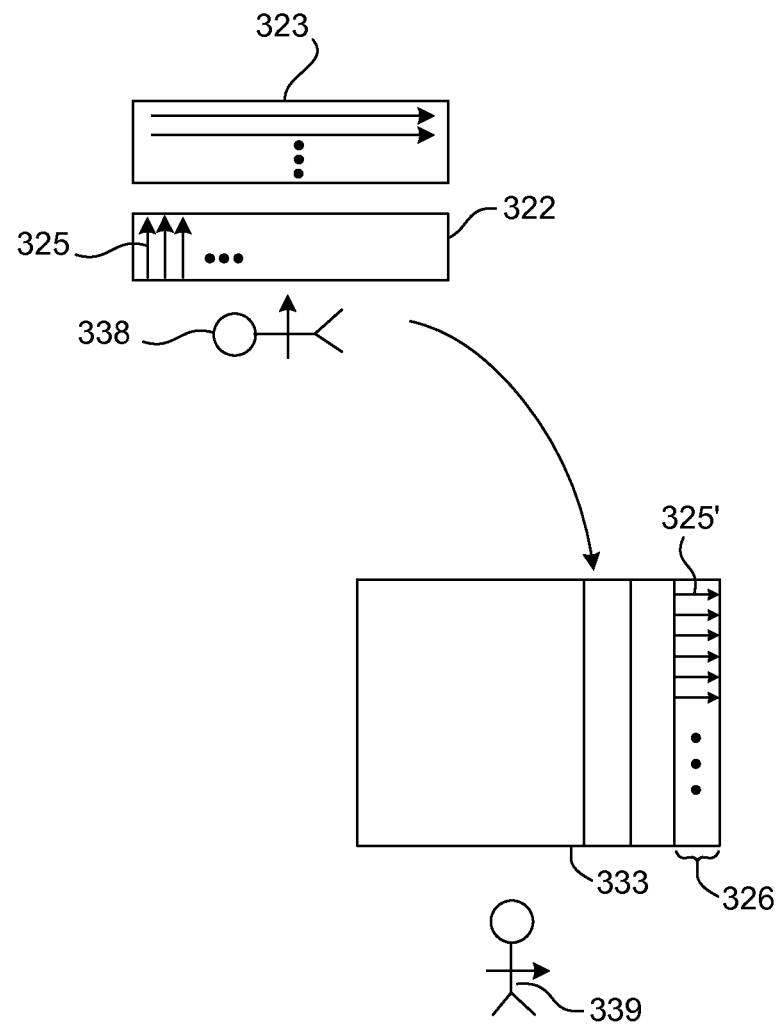

FIG. 4(b) more clearly illustrates the vertical read out and horizontal write processes that enable a high speed de-rotation of image data. The "stick figure" 338 figuratively illustrates the orientation of the image as it is received into the sub-frame memories 322, 323. A de-rotated "stick figure" 339 figuratively illustrates the orientation of the image, after de-rotation, as accumulated in the full memory element 333.

The received image data is horizontally written 328 into the sub-frame memory element 323 in rows of pixels (e.g., from left to right) until the sub-frame memory is full. In one implementation, that would mean until 8 rows of pixels are written to the sub-frame memory 323. As discussed, the exact number of rows is an implementation detail left to a designer and not limited by this disclosure. Contemporaneously, data is being read out from the other sub-frame memory element 322. With continued reference to FIG. 4(b), the data is vertically read out as a sequence of adjacent short columns of pixels with each column 325 (e.g., the columns M, M+1, M+2, . . . M+z, of FIG. 4(a)) having the same height as the sub-frame memory. These short columns (or segments) 325 are the horizontally written into a strip 326 (e.g., corresponding to sub-frame N of FIG. 4(a)) of a full frame memory element (i.e., 333). Written as a series of short horizontal rows or segments 325' (the same as vertical columns M, M+1, etc. only now written to memory 333 as short horizontal segments 325'). In the present example, each segment 325' is horizontally written into the full frame memory element 333 (e.g., DRAM memory) as a portion of a vertically oriented sub-frame (i.e., the vertical strip of data 326). In this implementation, each strip 326 is 8 pixels wide (corresponding to a height of a sub-frame memory element 322, 323). Here, in this particular approach, and the strips are written to the top right hand portion of the full frame memory element 333 and are progressively written from the top down until the data of the sub-frame 322 is exhausted.

As explained above, as this process is being performed, a next sub-frame is being horizontally written to the other sub-frame memory 332. Additionally, a next sub-frame (e.g., sub-frame N+1 (401)) is written to the full frame memory in a similar fashion. The only difference being that the process has shifted one strip over, writing a next 8 pixel wide sub-frame. Thus, a series of adjacent sub-frames are written to the full frame memory elements as a series of vertical strips. In this particular implementation, the full frame memory is written to so that the sub-frames are written from right to left, and the short vertical columns 325 are written horizontally to the full frame memory element as short horizontal rows 325' written from top to bottom. In this fashion, a de-rotation of an image rotated 90° counter clockwise (e.g., 338) can be returned to a top side up orientation 339.

However, the patent points out that the read/write order can be varied to obtain different degrees of de-rotation. Some examples are explained in detail below. Accordingly, the order of writing is dependent on the final desired orientation of the image.

To continue, the full frame memory element (e.g., 332, 333) keeps accumulating sub-frames in the fashion described above. When all of the sub-frames associated with the image frame 305 are accumulated at the full frame memory element, the image is complete. At this point, a correctly oriented full frame de-rotated image is resident in the full frame memory 333.

Typically, this de-rotated image frame is output from the full frame buffer module 331. This image frame can simply read out of the full frame element (e.g., 333) from left to right, top to bottom in a standard frame reading process. As the de-rotated image is being read out from the full frame buffer module 331, a next image frame is written into the other full frame memory element 332 in the same manner as was previously described for the other full frame memory element 333 (and where needed de-rotated by element 333). Thus, the system is well adapted to producing a continuous stream of de-rotated video data. Accordingly, high speed of de-rotated frames can be produced at relatively low cost by using the combination of a high speed two axis sub-frame memory (e.g., SRAM) and a less expensive memory that is not possessed of high speed access in both axes (e.g., DRAM). Thus, the full frame memories are continuously, and alternately, being written to and read from to generate a stream of de-rotated multimedia content that can be transmitted to an external sink device 302 for further processing and/or display.

Even more advantageously, embodiments of an adaptor 303 can perform high speed scaling using one or more scaling modules 309 that can form part of some embodiments. The implementation and or of implementation of these scaling modules 309 can enable various modes of vertical and/or horizontal scaling in accord with instruction and control provided by the control system 307 of the adaptor.

Figure 4C:
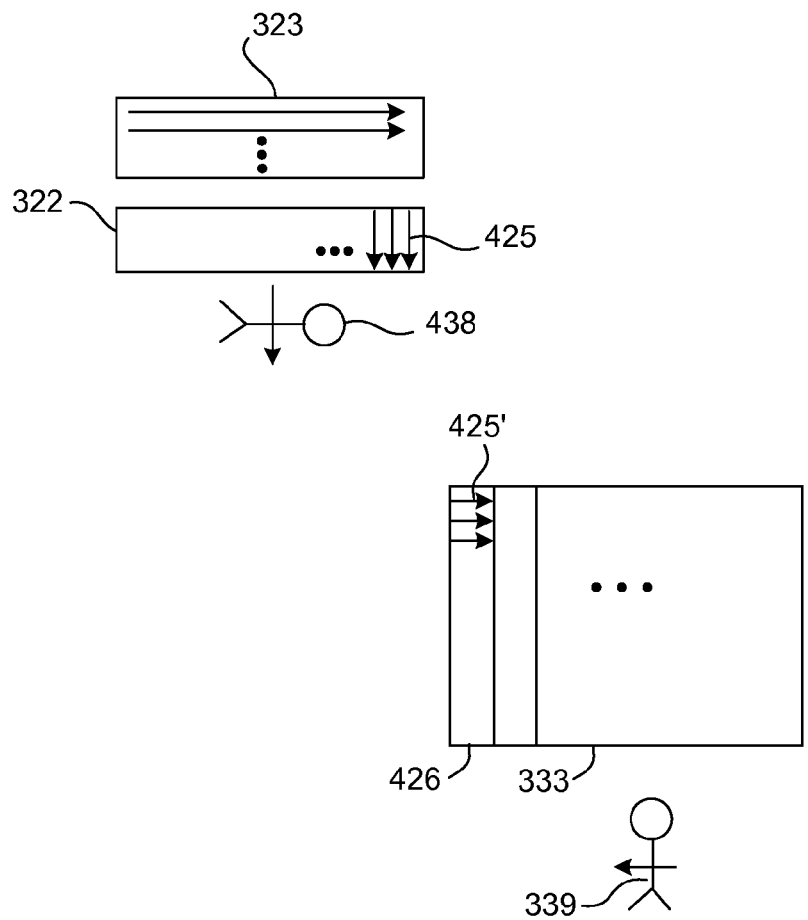

In a related approach, FIG. 4(c) addresses an approach for handling an image 438 that has been rotated 90° clockwise (i.e., instead of the 90° counter-clockwise examples (212, 338) of FIGS. 2(a)-2(d), 4(a), and 4(b)). Again, controller 307 receives rotation information (i.e., from the source 301) facilitating suitable de-rotation.

Referring to FIG. 4(a) & FIG. 4(c), the rotated image 305 horizontally written into the sub-frame memory elements 322, 323 in alternating fashion, for example, as described above. However, in this example, the sub-frame read/write process can be altered from the 90° counter-clockwise case illustrated above. Although the data sub-frame write process can be the same, the manner of sub-frame read processes can differ.

As shown in the relevant portions of FIG. 4(a) the sub-frame data is horizontally written into the appropriate sub-frame memory element (e.g., 322, 323). Then it is vertically read from that memory element. The manner of the vertical read accomplished de-rotation. As shown in simplified figurative drawing of FIG. 4(c), the clockwise rotated "figure" 438 illustrates image orientation of the image received into sub-frame memories 322, 323. Here, the output "figure" 339 figuratively illustrates the orientation of the image after de-rotation is performed in sub-frames 322, 323 which is output to full frame memory 333.

In this example, an eight row sub-frame element (322, 323) is horizontally written to by 424 writing horizontal rows of pixels (e.g., from left to right) until a sub-frame memory is full. Also as above, contemporaneously, data can be read out from the other sub-frame memory element 322. Here, the data is read vertically 425 in pixel columns that have the same height as the sub-frame i.e., 8 pixels high. However, in this de-rotation process, the sub-frames are read out from top to bottom and from right to left in an "opposite" manner than that suggested in FIG. 4(b) forming short vertical data columns. These short columns are then written to one of the full frame elements (e.g., 333) as short horizontal segments 425' (each associated with the vertically read sub-frame segment 425 of element 323). Thus, the sub-frames are written into the full frame memory 333 as vertical strips of data 426 containing a plurality of horizontally written short data strips 425' written one under the other (in this case). Moreover, in this implementation, a first vertical strip of data 426 is written to the top left hand portion of the full frame memory element 333. Subsequently, each short horizontal data strip 425' is progressively written from the top down until the data of the sub-frame is exhausted. Also, as before, as this process is being performed, a next sub-frame is being written to the full frame element 333 as another vertical strip of data 426 written to the right of the previously written strip. In this way the stream of sub-frames is written to the full frame element 333 one after another from left to right. Thus, a series of sub-frames are written to and accumulated at the full frame memory element 333 as a de-rotated image (e.g., 339) which is oriented generally the same as the initial image provided by the source device prior to rotation at the source. In this manner, the 90° clockwise rotated image 438 can be compensated for. It is pointed out that other implementations can be employed using the same general principle of horizontal writing to the sub-frame elements and vertically reading out the data to achieve de-rotation. The specification is not intended to be limited to only these two describe examples.

As before, the full frame memories 331, 332 are continuously, and alternately, being written to by the sub-frame elements 321, 323 and then read out from the full frame memories 331, 332 to generate a stream of de-rotated multimedia content which can be transmitted to an external sink 302 for further processing and/or display. Additionally, these frames can be scaled using a scaling modules 309 of an adaptor in accord with instruction and control provided by the adaptor control system 307.

Figure 4D:
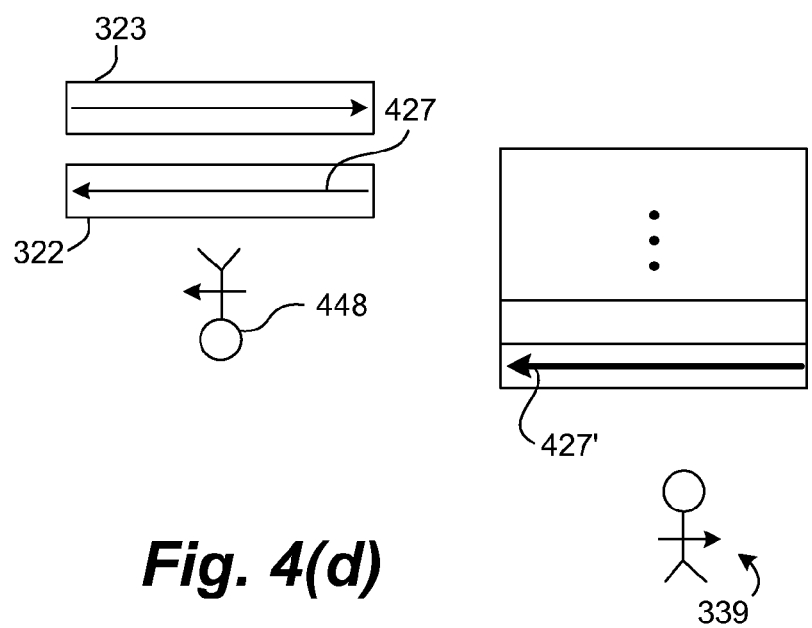

FIG. 4(d) briefly describes an approach suitable for handling de-rotating an image by 180° (rather than only 90° clock or counter-clockwise direction described above). As above, the adaptor controller 307 receives rotation information enabling suitable de-rotation to be performed. In this case, as before, sub-frames are written into the sub-frame elements 322, 323 in a manner as described above. However, this implementation differs from the 0° (which can simply bypass the modules 321,331) and the ±90° cases illustrated above. Again, one distinction is the manner in which data is read out of the sub-frame memories.

Briefly, the data is horizontally written 427 to the sub-frame memories (e.g., from left to right). However, unlike the prior approaches, the data can be simply be read out 427 in reverse order. For example, it can be read out 427 from right to left, contrary to the direction of write in. Subsequently as the data is read into 427' into the full frame elements 332, 333 also from right to left 427'. Additionally, data is written into the sub-frame memories from the bottom up. Thus, the upper most row of a first sub-frame is written to a bottom row of the full-frame, with each succeeding row written above the preceding row in like manner until the sub-frame has been read to the full frame memory. Additionally, each succeeding sub-frame written above the preceding sub-frame in a like manner (i.e., the top row written first with each succeeding row being written above the row immediately preceding it), thereby inverting and de-rotating the image 180°. Accordingly, FIG. 4(d) figuratively illustrates an "upside down" input image 448 reoriented to a correctly oriented image figure 339 after de-rotation and writing to the full frame memory 333.

As before, when all of the sub-frames associated with the original rotated image frame are written to the full frame memory the image is complete generating a de-rotated image (which is generally a "right side up" version of the initial image provided by the source device prior to rotation at the source) to be output to the sink 302. In this manner, the adaptor 303 compensates for the 180° rotation. Also as before, the methodology can generate a continuous stream of de-rotated images by alternately reading out and writing to the memory elements. Thus the adaptor 303 enables the de-rotation of all image data received from a source.

Even more advantageously, embodiments of an adaptor 303 can perform high speed scaling using one or more scaling modules 309 that can form part of some embodiments. The implementation and or of implementation of these scaling modules 309 can enable various modes of vertical and/or horizontal scaling in accord with instruction and control provided by the control system 307 of the adaptor.

Figure 5A:
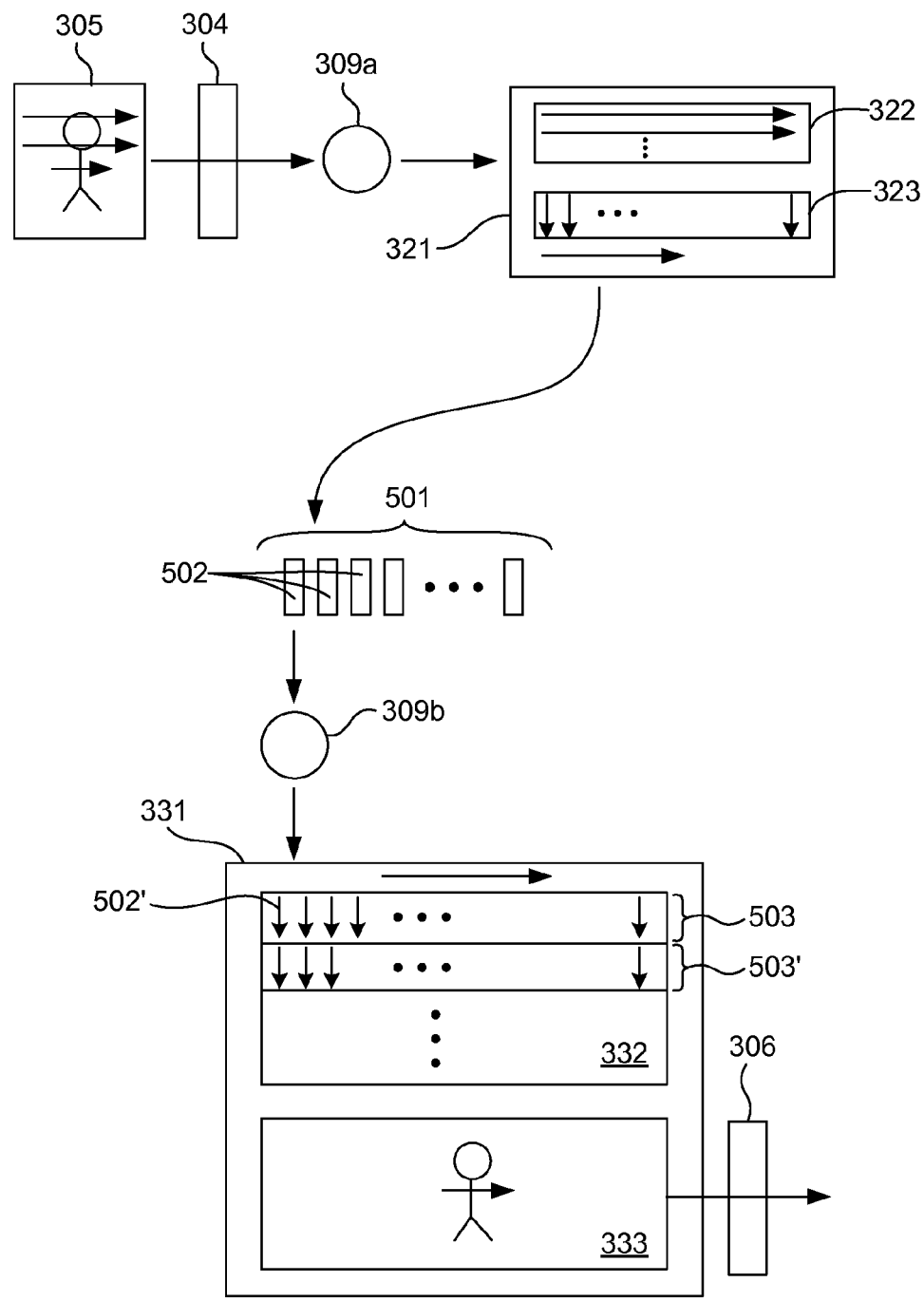
FIGS. 5(a) & 5(b) are flow diagrams illustrating a use and methodology for employing an adaptor embodiment to output scaled and de-rotated frames using the sub-frame module and a full frame module in accordance with embodiments of the present invention.
Figure 5B:
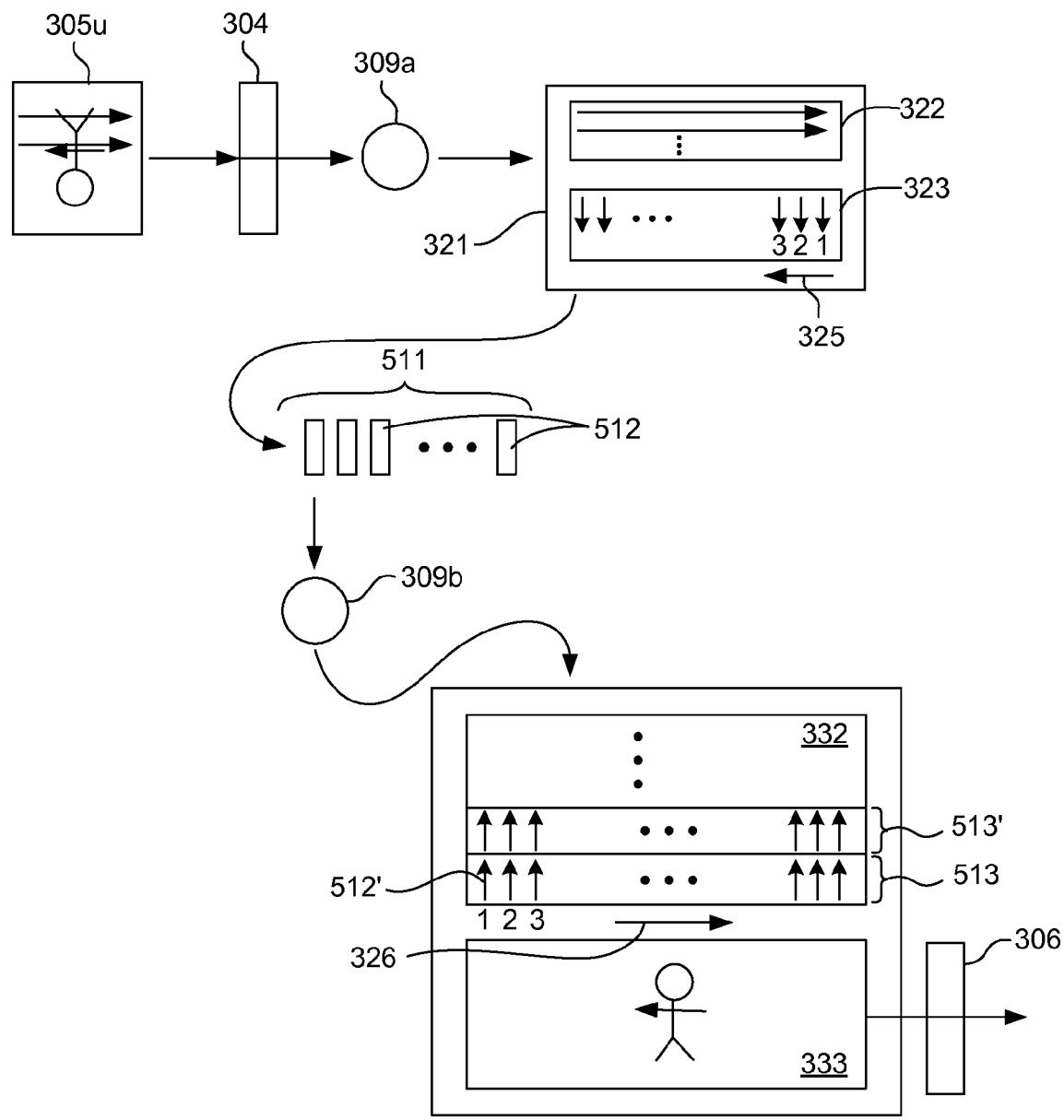

Further embodiments describe a wider implementation of the basic approaches thus far illustrated. FIGS. 5(*a*)-6(*f*) illustrate aspects of another adaptor embodiment and its associated integrated circuitry and associated implementations. FIG. 3(*b*) is again referred to as helpful for understanding scaling aspects of the invention as well as other embodiments.

Generally, input multi-media data 305 is received at an input interface 304 of the adaptor 303 and is processed by at least one of modules 321, 331, and/or scalers 309*a*, 309*b*, 309*c* before being output from interface 306. It is pointed out that the scalers (309*a*, 309*b*, 309*c*) are optional components used in some embodiments and need not be employed at all in some approaches. Moreover, the scalers are illustrated with respect to various operational pathways implemented in various adaptor processes rather than specific physical locations. For example, although depicted here as three separate scalers (309*a*, 309*b*, 309*c*), in various implementations a single scaler can be used to accomplish all of the scaling operations by being implemented at various points in the process and operating on various signals received from input interface 304, sub-frame memory module 321, full frame memory module 331 and so on. The scaler simply being implemented at various points in the process as determined by the controller 307. Although embodiments of the invention will typically employ two or three such scalers configured to rapidly perform scaled on the selected signals.

In a first process a first scaler 309*a* is configured as a horizontal scaler arranged to perform horizontal scaling (H-scaling) on data passing into the adaptor 303 through interface 304. Additionally, in this implementation, a second scaler 309*c* is also configured as an H-scaler arranged to perform an H-scaling on data output from the full frame memory module 331. This combination of scaling processes operates cooperatively to implement high speed vertical and H-scaling to rapidly scale image data. This process can operate in at least two ways depending on the circumstances. It is pointed out that where no scaling is desired these, and other scalers can be bypassed.

Also, in a related embodiment another scaler 309*b* can be implemented (or, for example, the operative position of scaler 309*c* can be altered to enable scaling operation between memory modules 321, 331) to enable high speed Vertical scaling (V-scaling) of portions of sub-frames as they are vertically read from the sub-frame memory buffers. It is pointed out that when and where the scalers 309*a*, 309*b*, 309*c* are implemented can be controlled by controller 307.

In a first implementation or process, data rows (e.g., data rows of image 305) are into adaptor 303 via interface 304. These data rows can be processed through scaler 309*a* and then written to the sub-frame memories 322, 323 of the sub-frame module. In one embodiment, the scaler 309*a* horizontally scales the input data rows using any of a number of scaling algorithms. The long lines of data enable excellent high speed H-scaling. The big prior art problem was accessing the vertical columns for high-speed scaling. As explained before, the row-addressing setting delays inherent in DRAM circuitry places a severe constraint on processing times making it all but unsuitable for video processing. Additionally, the cost of full frame SRAM memories is so prohibitively expensive that it is unrealistic to use them in such an adaptor. Thus, the prior art suffers from being able to achieve high speed V-scaling. Many embodiments of this invention overcome this limitation.

Where 90° rotated input images (e.g., 338, 438) are received by the adaptor 303, an added process can be used to accelerate the scaling process. The now scaled sub-frames are now received at the full frame module 331. Because in a de-rotation process (as described above) writes the data to the full frame memories 332, 333 as a series of short horizontally oriented segments (having a width the same as the height of the sub-frame memories) arranged in a vertical strip, the entire frame becomes rotated. Accordingly, the former horizontal axis is now the vertical axis of the de-rotated full frame. Additionally, and importantly, this de-rotation has now made the former horizontal axis into the vertical axis. This means that the full frames are now vertically scaled. Additionally, because the full frame is already vertically scaled, the laborious and slow process of attempting V-scaling is already addressed. Accordingly, the full frame memories 332, 333 need not have high speed vertical data access. As a consequence cheaper DRAM type memory elements can be used.

To continue, the H-scaling of the full frames can be achieved by performing a second H-scaling (e.g., using scaler 309*c*) operation on the full frame data rows as they are read out from the full frame memories 332, 333 and output to the output interface 306. The second scaling operation can be performed by a second scaler 309*c* or, in some cases, the data can be output from the full frame module 331 and input again into the scaler 309*a* to perform a second H-scaling. It is believed that a system using two scalers 309*a* and 309*c* will be a faster and more efficient alternative, but both are possible.

Additionally, the adaptor can function well in a case where the input images are rotated at 180° or where the input image is not rotated at all but merely would benefit from high speed scaling. A slightly different process is used. As before, rotation status or scaling requirements can be supplied to the controller 307 as needed by source, sink, or adaptors systems. Also as before, the input images (e.g., rotated or not) are received by the adaptor 303 via interface 304. Because a 180° de-rotation process (or no de-rotation) does not orient an image at 90° from the input image to same process cannot be used to achieve scaling in both axes. However, it is pointed out that a high speed multi-access architecture such as suggested by SRAM memory elements still can vertically read out data at a rate far faster than that of a DRAM element. Thus, the inventive architecture can be used to provide and accelerated vertical and H-scaling operation. FIG. 5(*a*) illustrates briefly, how such can be achieved in accordance with an embodiment of the present invention. As before an input image 305 is received at the input 304 of the adaptor. The controller 307 has received relevant information from at least one of the source, sink, or adaptor information that can be used by the controller to determine whether the image 305 requires scaling, de-rotation, or both.

In the example of FIG. 5(*a*), the data is to be scaled in both the x and y axes and de-rotated. Accordingly, as in the example above, input data rows of the image 305 can be can be processed through scaler 309*a* to achieve horizontally scaling of the data rows. These horizontally scaled data rows are then horizontally written to the sub-frame memories 322, 323 of the sub-frame module. As before, the scaler 309*a* horizontally scales the input data rows using any of a number of scaling algorithms.

Once the sub-frames are ready to be output (typically after all of the requisite data rows fill a sub-frame memory element), the sub-frame data is read out from the sub-frames as a series of short vertical columns 502, the sum total of which comprise the output sub-frame 501.

In this implementation the data is read out in columns from top to bottom proceeding from left to right. In reality, the order is not so important as that the write order which the data is written to the full frame memories 332, 333. The sub-frame read out process needs to be synchronized with the full frame write process to properly orient the full frame. Such is within the skill of one having ordinary skill in the art.

Once the series of short vertical columns 502 is vertically read out of an associated sub-frame element (e.g., 323) they are forwarded to a second scaling process. Here the second scaling process is a V-scaling process performed at scaler 309b. This enables the short vertical columns 502 to be scaled one after another and then be written to one of the full frame memories 332, 333. Each short vertical column 502 has a height equal to the number of rows in the sub-frame memory element. In one case, with an 8 row sub-frame memory element, eight pixel high columns 502 are scaled by scaler 309b and then written to a full frame memory element 332, 333 as a series of scaled short vertical columns 502'. Here, the columns are written from top to bottom, one column after another as adjacent columns are written into the full frame memory element from left to right. Once the entire sub-frame is written an eight pixel high sub-frame is resident in the full frame element. A next sub-frame will then be written in the following full frame rows (e.g., rows 9-16) just below the immediately preceding sub-frame. As shown here, sub-frame 503 is written to the full frame memory 332, then sub-frame 503' is written, and so on. One after another until an entire image frame (e.g., 305) is written to the full frame memory element. Of course, the data could be read out from the sub-frame element from left to right or from the bottom of the sub-frame to the top, but that is merely an implementation detail and is not intended to limit the invention. Once, the entire frame is accumulated in the full frame element 332, 333 it can then be output (e.g., to interface 306) or in some cases, processed elsewhere by other aspects of the adaptor. It is pointed out that the scaler 309b could be scaler 309c operated in a different point in the process as controlled by controller 307. Alternatively, the scaler 309b could be scaler 309a also operated in a different point in the process as controlled by controller 307. In one preferable embodiment, three scalers 309a, 309b, 309c are used.

Once the series of short vertical columns 502 is vertically read out of an associated sub-frame element (e.g., 323) they are forwarded to a second scaling process. Here the second scaling process is a V-scaling process performed at scaler 309b. This enables the short vertical columns 502 to be scaled one after another and then be written to one of the full frame memories 332, 333. Each short vertical column 502 has a height equal to the number of rows in the sub-frame memory element. In one case, with an 8 row sub-frame memory element, eight pixel high columns 502 are scaled by scaler 309b and then written to a full frame memory element 332, 333 as a series of scaled short vertical columns 502'. Here, the columns are written from top to bottom, one column after another as adjacent columns are written into the full frame memory element from left to right. Once the entire sub-frame is written an eight pixel high sub-frame is resident in the full frame element. A next sub-frame will then be written in the following full frame rows (e.g., rows 9-16) just below the immediately preceding sub-frame. As shown here, sub-frame 503 is written to the full frame memory 332, then sub-frame 503 is written, and so on. One after another until an entire image frame (e.g., 305) is written to the full frame memory element. Of course, the data could be read out from the sub-frame element from left to right or from the bottom of the sub-frame to the top, but that is merely an implementation detail and is not intended to limit the invention. Once, the entire frame is accumulated in the full frame element 332, 333 it can then be output (e.g., to interface 306) or in some cases, processed elsewhere by other aspects of the adaptor. It is pointed out that the scaler 309b could be scaler 309c operated in a different point in the process as controlled by controller 307. Alternatively, the scaler 309b could be scaler 309a also operated in a different point in the process as controlled by controller 307. In one preferable embodiment, three scalers 309a, 309b, 309c are used.

In a related example, FIG. 5(*b*) is a simplified illustration of one possible approach for processing image data to achieve de-rotation of a 180° rotated image and x, y scaling. Accordingly, as in the example above, a source image 305u is received (in this case being 180° rotated) at input 304 of the adaptor 303. Subsequently, data rows of the source image 305u are processed through scaler 309a to achieve horizontally scaling (H-scaling) of the data rows. As above, these data rows are horizontally written to the sub-frame memories 322, 323 of the sub-frame module 331 as a stream of horizontally scaled data rows. As before, the scaler 309a horizontally scales the input data rows using any of a number of scaling algorithms.

Here, also as above, the sub-frame data is read out from the sub-frame memories as a series of short vertical columns 512, the sum total of which comprise the output sub-frame 511. Here, for example, these columns 512 are read out from the sub-frame memory (here 323) starting from the left and reading from the top of a sub-frame to a bottom. Again, the columns are read proceeding from left to right (e.g., in an order specified by the numbers 1, 2, . . . until the sub-frame ends). It must be pointed out that other orders and read directions can be used. It is the combination of sub-frame reading and full frame writing that enable de-rotation and frame re-orientation in the full frame elements. The following is just one non-limiting method of accomplishing this goal. Modes of achieving synchronization of sub-frame read and full frame write processes are within the skill of one having ordinary skill in the art.

Accordingly, a sub-frame element 323 is read out from top to bottom of the sub-frame to generate a series of short vertical columns 512 wherein the columns 512 are read out from left to right 325 (e.g., 1, 2, 3 . . . ). As before, the series of short vertical columns 512 is forwarded to a second scaling process, here, performed as a vertical scaling process at scaler 309b. Because an H-scaling has already been performed at 309a, the second V-scaling by 309b generates a stream of short H/V scaled vertical columns 512' which are written to one of the full frame memories 332, 333. As before, each short vertical column 512, 512' has a height equal to the number of rows in the sub-frame memory element (e.g., 323). In one case, with an 8 row sub-frame memory element, the short columns 512 can be eight pixels tall. In this embodiment, the H/V scaled columns 512' are written to the full frame memory in a "reverse" order. For example, a first sub-frame is written to a bottom most portion 513 of a frame (which can be the bottom of full frame element 332). Additionally, the columns themselves can be read into the element 333 from bottom to top, shifting one column to the right to write the sub-frame from right to left (e.g., 1, 2, 3 . . . ). Once the entire sub-frame is written the sub-frame, the sub-frame is stored 513 in the full frame element. A next sub-frame will then be written above the immediately preceding sub-frame in a like manner to form a next stored sub-frame 513'. These sub-frames are written one after another until an entire image frame (e.g., 305*u*) is written to the full frame memory element enabling a fully H/V scaled and de-rotated frame to be written to the full frame element.

Of course, the data could be read out from the sub-frame element in another order and written to the full frame in another complementary orders so long as the frame 305*u* becomes scaled and reoriented to de-rotate the image. The illustrated process is merely an example and is not intended to limit the scope of the invention. As before, the sub-frames are accumulated in the full frame element until the entire frame is accumulated. Then the full H/V scaled and de-rotated image frame can be output from the full frame elements 332, 333. Such can be output to interface 306 or in some cases, processed elsewhere by other aspects of the adaptor. It is pointed out that the scaler 309*b* could be scaler 309*c* selectively operated at this point in the process by controller 307. Alternatively, the scaler 309*b* could be scaler 309*a* also operated in a different point in the process as controlled by controller 307. In one preferable embodiment, three scalers 309*a*, 309*b*, 309*c* are used.

FIGS. 6(*a*)-6(*f*) provide simplified flow diagrams used various processes used by the adaptor 303 to process image data. For example, FIGS. 6(*a*)-6(*d*) illustrates one embodiment for enabling de-rotating and scaling image data in accordance with embodiments of the invention. Such embodiments can employ an adaptor 303 operating using at least the modes of operation described herein. Such methods can be embodied in software instructions resident in tangible computer readable media or operate as firmware resident on various circuitry of an adaptor 303. In general such computer readable instruction can be stored on a non-transitory computer readable media.

In the following example, multi-media data is provided (Step 601) generally in the form of images or a video signal. Typically, such data can include an image signal (e.g., image signal 305) provided by the source device 301. Information concerning the source and external display capabilities as well as information concerning the image can also be provided to the adaptor.

A determination is made as to whether image processing is to be performed on the image data (Step 603). The adaptor 303 can process image data to enable image de-rotation, scaling, or a combination of such processes as well as performing other operations on the image data. For example, the adaptor systems (e.g., controller 307) can determine whether the image data comprises a "rotated" signal suitable for de-rotation. For example, rotation status information can be provided to the adaptor 303 using a side band signal or other non-image signal. Also, the image itself can include data identifying the image as having been rotated. Image content and system information can be sued to determine a need for or possibility of performing scaling. In general, source image and sink (display) parametric information can be used by the adaptor 303 to determine the type of processing to be used by the adaptor. As can be appreciated by those of ordinary skill, other methods of ascertaining rotation status can be provided to the control circuitry 307 of the adaptor 303.

In a case where the image is not rotated (i.e., no need for de-rotation) or no scaling is required, the scalers 309*a*, 309*b*, 309*c* and well as the de-rotation systems of the adaptor (e.g., memory modules 321, 331) can be bypassed (Step 611). For example, the image signal need not be processed by the sub-frame memory module 321 or the full frame memory module 331 if the source image does not require de-rotation or scaling. Such "unprocessed' signals can simply be forwarded through or transmitted by the circuitry of the adaptor such that the systems 309, 321, 331 (as well as others) are simply bypassed (Step 613), thereby enabling the signal to be output from the adaptor without further processing.

In a case where the image is to be processed (e.g., de-rotated, scaled, or otherwise processed) otherwise utilizes some de-rotation, adaptor systems can be used to process the image data (Step 621) and then outputting the processed image data to an external sink device 302 (Step 661). In one case the image data is process through one or more of the memory modules 321, 331 and/or scalers 309*a*, 309*b*, 309*c*.

FIG. 6(*b*) illustrates some example process approaches enabled by the adaptor described herein. In one approach (Step 631) a process for image de-rotation is described. In another approach (Step 641) a process for image scaling is described. In another (Step 651) a process enabling both scaling and de-rotation is described.

Referring to FIG. 6(*c*) an approach for performing image de-rotation (Step 631) is briefly described. As indicated above, source image information and information concerning sink device capability are received and a determination is made as to what processes are performed on the received source image 305 (steps 601, 603).

In this case, image 305 has been subject to rotation that requires de-rotation to enable viewing at a proper orientation. The received rotated signal 305 is processed to generate a plurality of sub-frames. For example, this can be accomplished by horizontally writing portions of the image frames 305 to the sub-frame memory 321 to generate image sub-frames (Step 632). As described above, this process involves horizontally writing portions of the image data from the incoming source image frame to one of the sub-frame memory elements 322, 323. Once a first sub-frame memory element (i.e., 322 or 323) is filled with horizontally written image data, a second sub-frame is written to the second sub-frame element. Meanwhile, once filled, the first sub-frame memory element is then read out for further processing. As explained above, in this case, the sub-frame resident in the first sub-frame memory element is vertically read out as a stream of adjacent short columns (for example as described with respect to FIGS. 3(*b*), 4(*a*), 4(*b*), 4(*c*) and elsewhere). As before, this process operates in alternating fashion with one sub-frame element being written a sub-frame memory element as data is being read out from the other sub-frame element.

Important, is the manner in which the sub-frames are alternately read out from the sub-frame elements. Accordingly, the sub-frames are read out in a manner suitable to reorient the sub-frames as a relatively high rate of speed (Step 633). Because the sub-frame memory elements are configured to enable high speed processing in both x and y axes the manner of read out can substantially improve the efficiency of de-rotation process without having to run the main frame memory (typically comprising a DRAM or other memory device) at prohibitively high rates. In some cases the sub-frames can be advantageously read out by a vertical read process. In another process (like a 180 degree de-rotation process) a horizontal read process can be used as described above. To enable 90°/270° de-rotations the sub-frames can be vertically read from the sub-frame memory elements (Step 633). Such a vertical read process for 90°/270° de-rotations and a horizontal read process for addressing 180° de-rotation has been discussed above. Also, the reading and writing to the sub-frame buffers (memories) is done in an alternating fashion. Thus, a continuing process of horizontally writing data in to the sub-frame elements and vertically reading out (except for the aforementioned 180° de-rotation process) the sub-frames in alternating fashion can be used to reorient source images. Example processes are illustrated with reference to FIGS. 3(b) 4(a)-4(d), thereby generating a continuous alternating cycle of sub-frame reading and writing. As explained above, the sub-frame read process can reorient (de-rotate) the source image data.

This data is then written to one of the full frame full frame memory elements 332, 333 of the full frame module 321 to form reoriented sub-frames in the full frame memory elements (Step 634). Depending on the type of de-rotation sought, the data can be written to the full frame memory elements as long horizontal data lines (to reorient 180° rotated input) or as vertical strips comprising many short horizontal data lines (corresponding to the short vertical columns of the associated sub-frame).

These re-oriented sub-frames are then accumulated in the full frame memory elements 332, 333 of the full frame module 321 (Step 635). Once one of the full frame memory elements 332, 333 has an entire de-rotated image frame accumulated, that image frame can be output from the module 321. As one of the full frame memory elements 332, 333 is being read from the memory element, further sub-frames are being 332, 333 written and accumulated at the other full frame memory element.

As the full frames are output (for example, from the full frame module 331) they are output to the external display (Step 661) where they can be displayed by a sink device and/or otherwise subject to further processing (e.g., scaling, color correction, and so on). In some implementations, scalers 309 of the adaptor 303 can be used to perform scaling operations at the adaptor before transmitting the signal to the display 302. Some of the advantages and disadvantages of such an approach have been discussed herein.

Figure 6A:
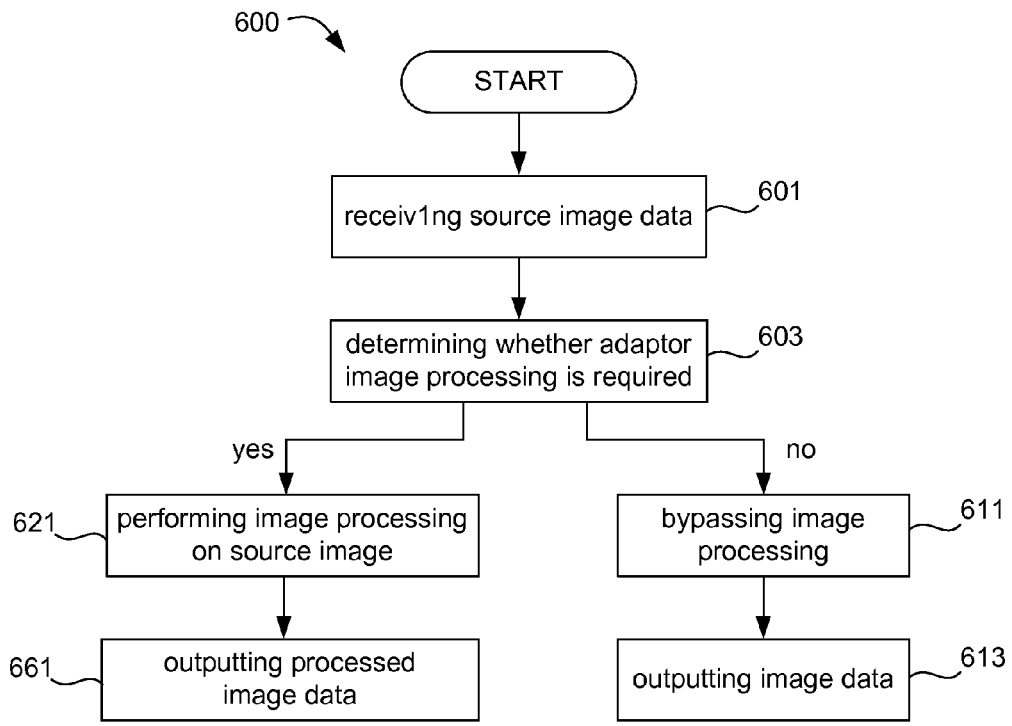
FIGS. 6(a)-6(f) are flow diagrams and associated schematic adaptor diagrams illustrating adaptor operation in accordance with embodiments of the present invention.
Figure 6B:
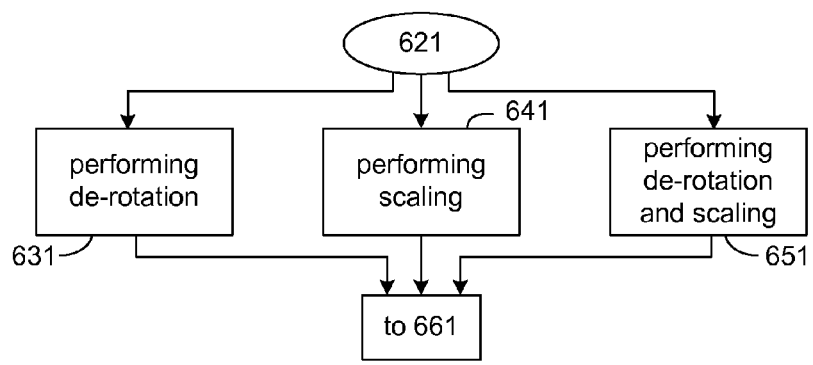
Figure 6C:
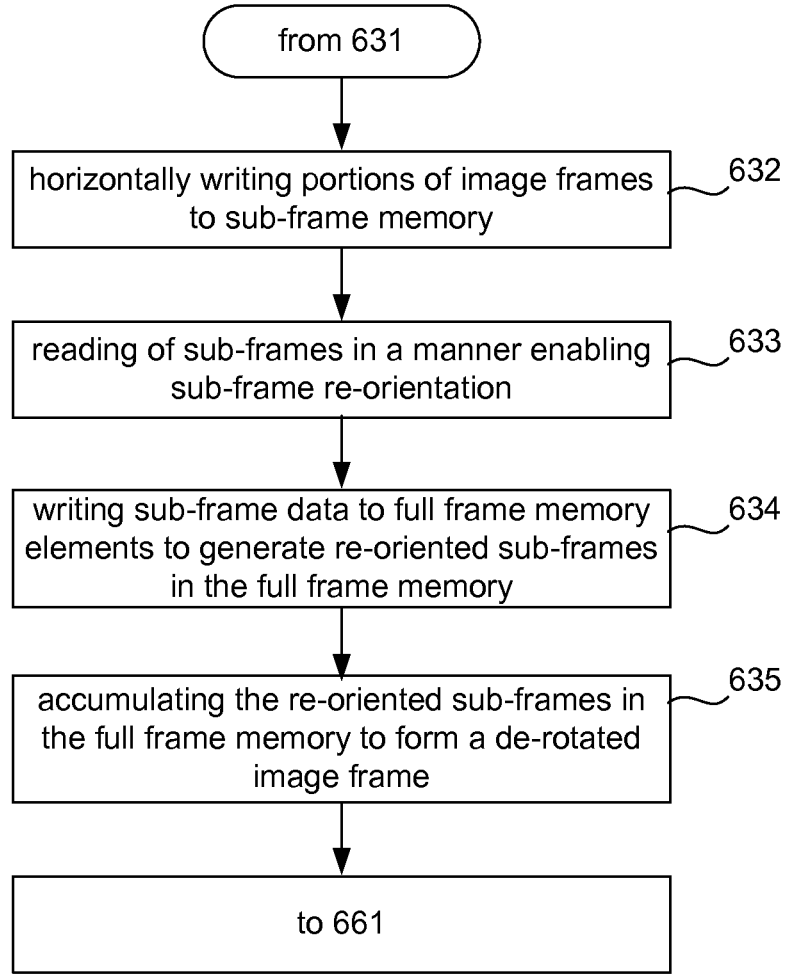
Figure 6D:
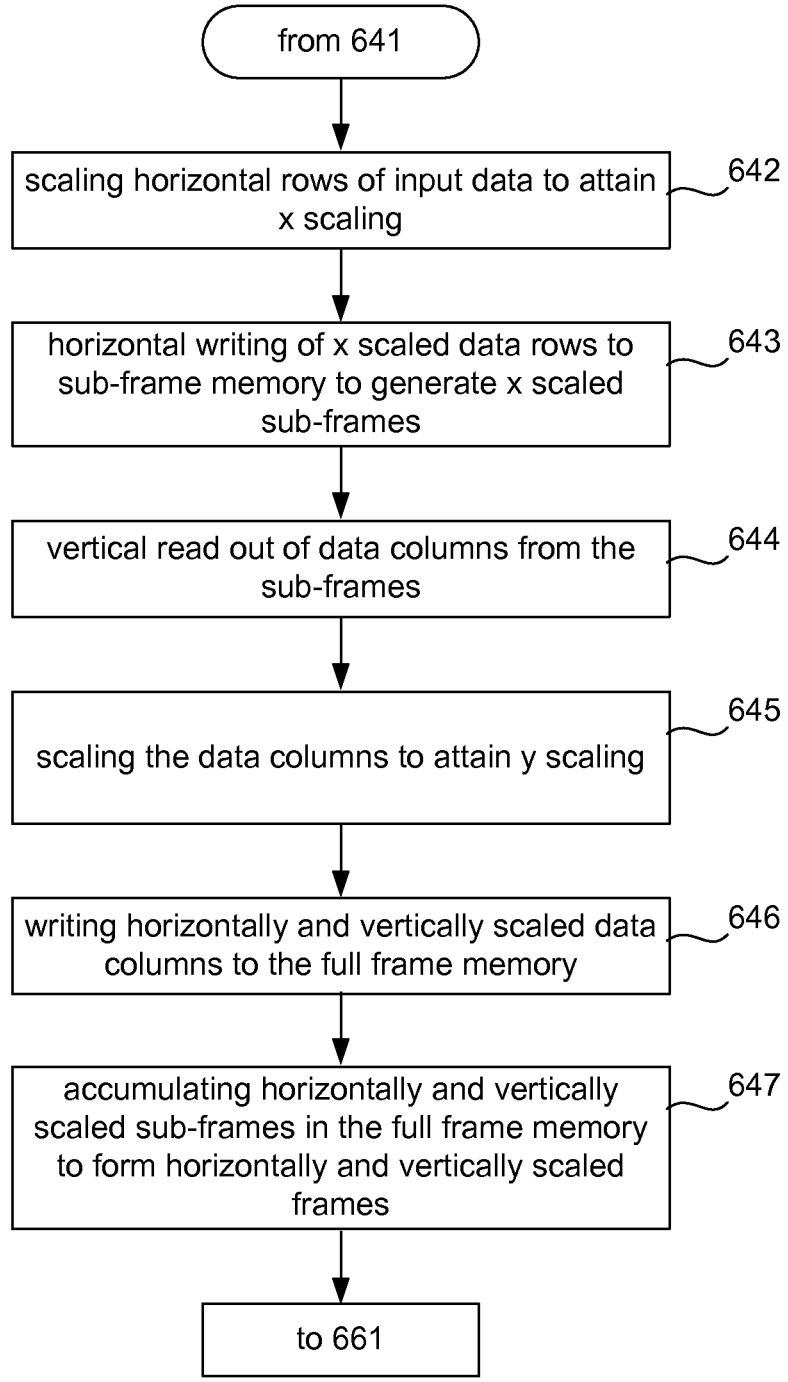
Figure 6E:
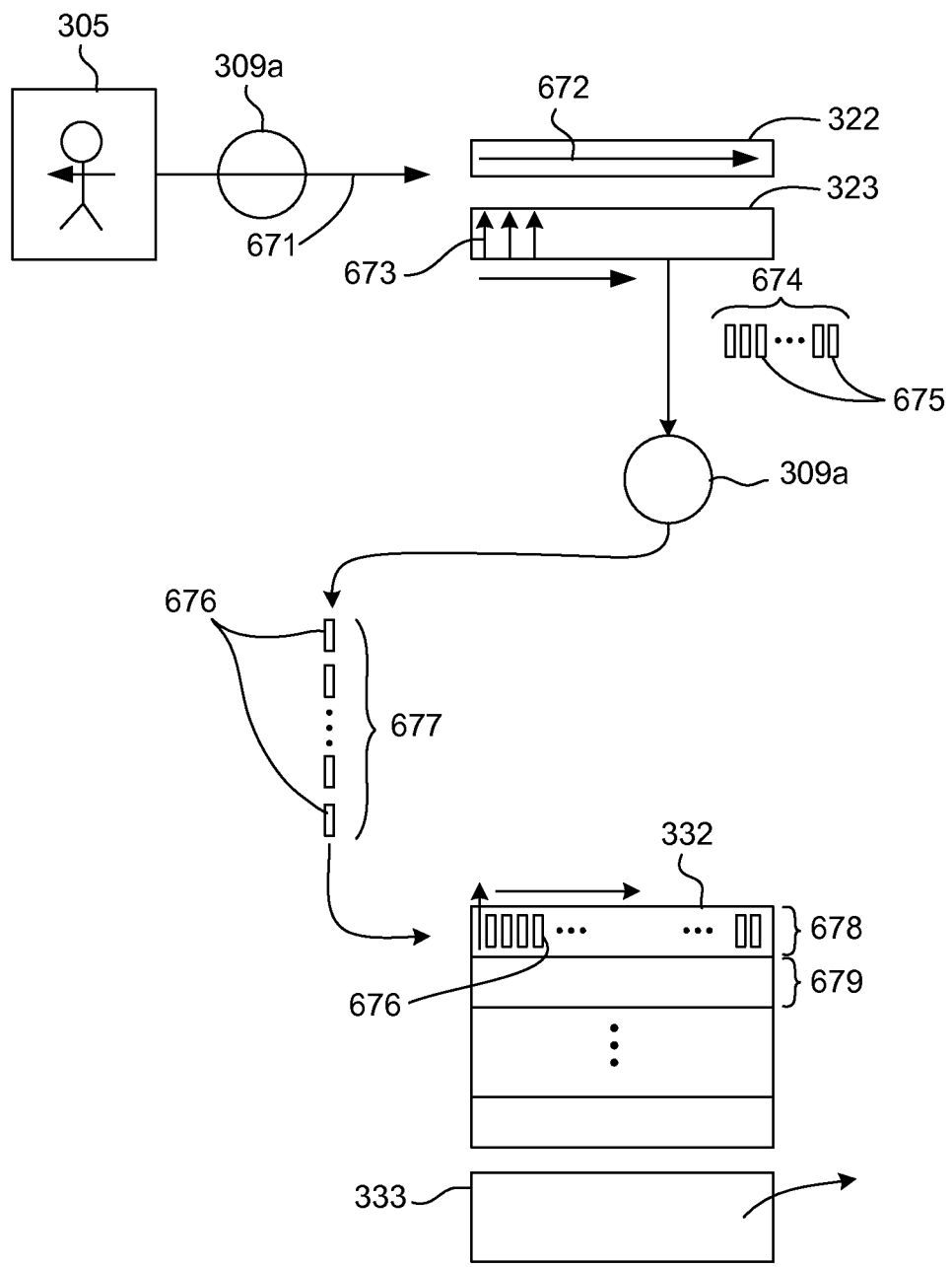

FIGS. 6(d) and 6(e) describe on embodiment for enabling high speed x and y scaling of a source image without performing de-rotation. The process is similar many of the processes described previously. Although, it cannot take advantage of the effect de-rotation has on two axis scaling, it can benefit from the fast access times made available by the sub-frame elements 322, 323 of the sub-frame module.

One approach for performing scaling without de-rotation (Step 641) is briefly described. As indicated above, source image information and information concerning sink device capability are received and a determination is made as to what processes are performed on the received source image 305 (steps 601, 603 of FIG. 6(a)). In this case, the information is processed by adaptor controller 307 to determine that image 305 can be scaled but does not require de-rotation to format the image for display.

Accordingly and with reference to FIGS. 6(d) & 6(e), a process for scaling without de-rotation is described. In this case, the information is processed by adaptor controller 307 to determine that image 305 can be scaled without need for de-rotation to format the image for display. The image data is received into the adaptor and subject to H-scaling (e.g., using scaler 309a) which scales horizontal data rows (Step 642) as they are received.

These scaled horizontal data rows 671 are horizontally written to and accumulated in the sub-frame memory elements to form sub-frames (Step 643). For example, this can be accomplished by horizontally writing 672 scaled data rows 671 into the sub-frame memory (e.g., 322 or 323) to generate the image sub-frames.

The adaptor can take advantage of the high speed y read out capabilities of the sub-frame memory elements 322, 323 to effectuate high speed V-scaling. Accordingly, the horizontally scaled sub-frame data is read out 673 from the sub-frame memory elements as a plurality of short vertical columns 675 (in one embodiment, 8 pixels tall) (Step 644) that comprise now the horizontally scaled sub-frame 674. As explained above, the data 674 from a sub-frame memory element is vertically read out as a stream of adjacent short columns 675 (for example as described with respect to FIGS. 3(b), 4(a), 4(b), 4(c) and elsewhere).

As before, the sub-frames are vertically read out in a manner that enables the resulting image to be correctly oriented. Here the process is particularly straight forward as the source image does not require de-rotation. In one possible implementation, the columns are read out from bottom to top and from right to left. Other vertical read processes are possible. As before, such a process continually operates writing one sub-frame to sub-frame memory as data in the other sub-frame memory element is being read out.

As indicated above, because the sub-frame memory elements are configured to enable high speed processing in both x and y axes, the vertical read out can be at a relatively high rate of speed. Although the vertical read process only applies to a single sub-frame at a time, all the sub-frames associated with a single full frame can still be read much faster than a vertical read out from a single full frame DRAM element.

The short vertical columns 675 can then be processed by a scaler (e.g., 309b) to attain scaling of the short vertical columns as the are passed through the scaler (Step 645) before entry into a full frame memory. The operational process of V-scaling occurs before introduction of the frames to a full frame memory.

Accordingly, these horizontally and vertically scaled data columns 676 are output from scaler (e.g., 309b) as a stream of vertical data columns 676 (together comprising a horizontally and vertically scaled sub-frame 677). These vertical data columns 676 are then written to one of the full frame full frame memory elements 332, 333 of the full frame module 321 (Step 646). Thereby writing correctly oriented and fully scaled sub-frames into the full frame memory elements. In one example, these vertical data columns 676 are written to the full frame memory as a horizontal strip 678 (each comprising a single sub-frame) comprising a series of adjacent vertical data columns 676. In one embodiment, the vertical data columns 676 can be written from left to right of the vertical strip 678 and also from top to bottom of the strip. A next strip 679 will written under the strip before and so on until the entire frame 305 is written to the full frame memory element. As in the embodiments above, once one sub-frame is read out from its associated sub-frame memory, a next sub-frame is read out from the other sub-frame memory, and so on in alternating fashion.

These horizontally and vertically scaled strips 647 of sub-frames are accumulated in the full frame memories 332, 333 until an entire image frame accumulated in said full frame memory (Step 647). Once the scaled frame is accumulated it can be output from the full frame memory (Step 661). For example, they can be output to the interface 306 and then to an external sink device where it can be displayed and/or otherwise subject to further processing (e.g., scaling, color correction, and so on).

Figure 6F:
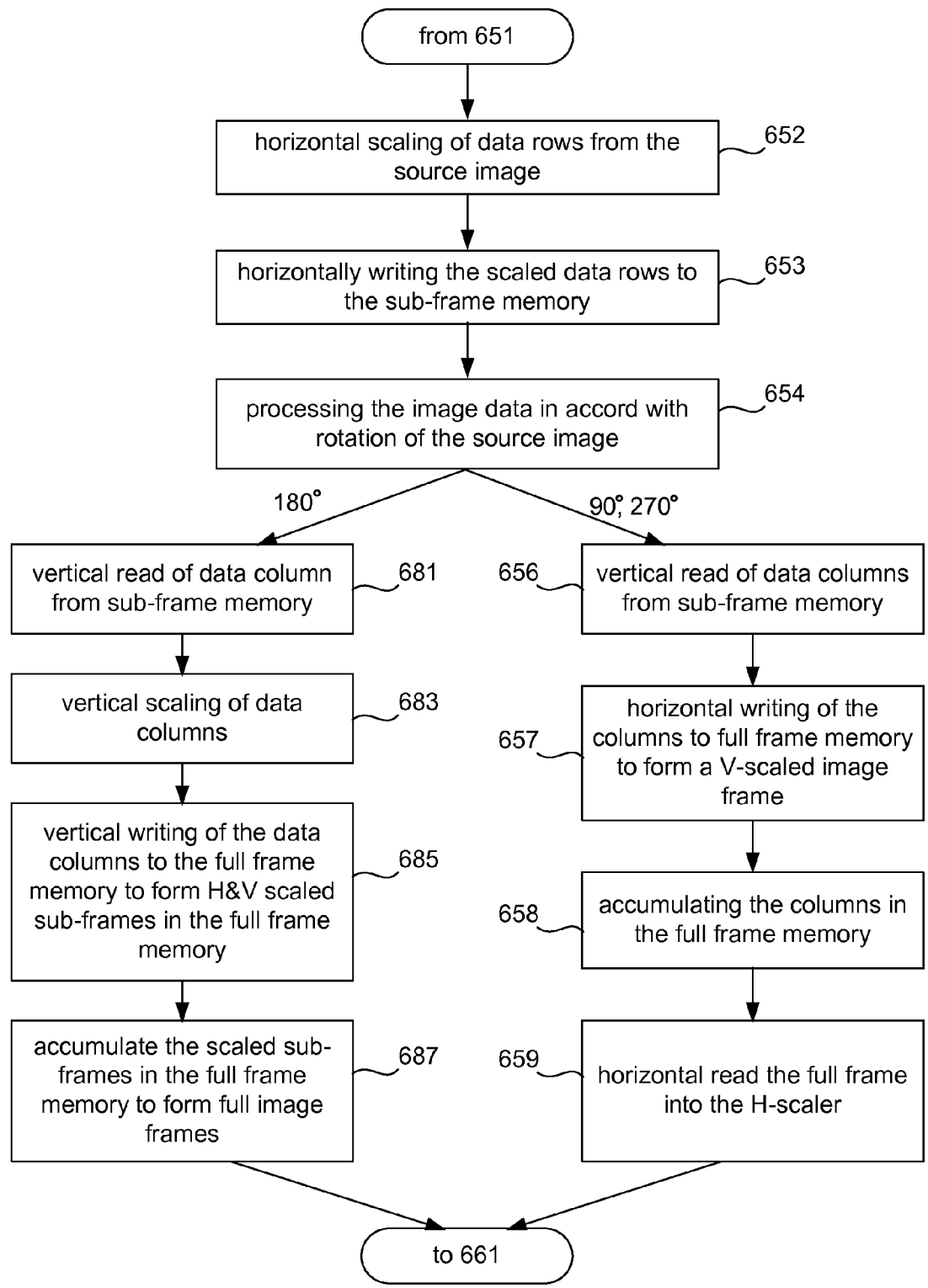

In another approach, as indicated by Step 651 of FIG. 6(a), the images can be both de-rotated and scaled. FIG. 6(f) provides a flow diagram illustrating aspects of such a process. Examples of suitable processes are described in some detail with respect to FIGS. 5(a) and 5(b) as well as elsewhere in this patent.

Such a process can begin at Step 621 of FIG. 6(a) and further detailed in FIG. 6(f). The FIG. 6(f) flow diagram begins with a H-scaling (H-scaling) of the received source image data (Step 652). One embodiment of such an H-scaling process is described, for example, in the discussions concerning FIGS. 5(*a*) and 5(*b*). Such scaling can be achieved in a line by line process.

These horizontally scaled data rows are then written to the sub-frame memories (Step 653). Again, one embodiment of such a process is described, for example, in the discussions concerning FIGS. 5(*a*) and 5(*b*). Typically, said data writing processes can be achieved in a line by line process.

The process operations diverge at Step 654 wherein source images that are rotated 90° or 270° are processed in accordance with operations 656-659 source images that are rotated 180° or not rotated at all (i.e., 0°) are processed in accordance with operations 681-689.

In a first processing branch (described by operational path 656-659) enables de-rotation and H/V scaling of source images that have rotated 90° or 270° at a source device 301.

Image data that has been H-scaled (in Step 652) and previously written to the sub-frames is then vertically read from the sub-frame memories (Step 656). As described above, the manner of such vertical reading is done such that a subsequent write process to a full frame memory enables the sub-frames to be oriented in a viewable orientation (i.e., de-rotated).

As also indicated above, the vertical read process generates a stream of short vertical data columns that are horizontally written to the full frame memories of the adaptor (Step 657). The method of such a write process is such that a resultant image stored in the full frame memory is correctly oriented (i.e., de-rotated). Importantly, this write process transforms the previously H-scaled sub-frame data into vertically scaled (V-scaled) sub-frame data. Accordingly, the previously read vertical data columns are then written as a series of vertical strips into the full frame elements. Wherein each of the strips comprise a series of short horizontal partial rows to generate a de-rotated and H/V scaled strip of data. A number of suitable de-rotating write modes having previously been described.

These H/V scaled sub-frames (vertical strips) are then accumulated in a full frame memory until an entire image frame is accumulated in the full frame memory (Step 658).

Accordingly, this now H-scaled full frame, is then horizontally read out from the full frame memories (Step 659). As described above, the manner of such vertical reading is done such that a subsequent write process to a full frame memory enables the sub-frames to be oriented in a viewable orientation (i.e., de-rotated).

The de-rotated and fully H/V scaled full frames are then output for further processing or display (Step 661 of FIG. 661).

In another process enabling de-rotation and scaling of source images that are rotated 0° or 180° is described. To begin, it is pointed out that the process for handling un-rotated images is described with respect to FIGS. 6(*d*)-6(*e*).

To enable the de-rotation and H/V scaling of source images that are rotated 180°, a process conducted in accordance with operations 681-689 can be employed.

Such a process can begin at Step 621 of FIG. 6(*a*) and further detailed in FIG. 6(*f*). One embodiment of such a process has been outlined with respect to FIG. 5(*b*). Again the process begins with a H-scaling (H-scaling) of the received source image data (Step 652) and then writing the horizontally scaled data rows to the sub-frame memories (Step 653). A typical write process can be achieved in a line by line process writing the source frames into the sub-frame in a series of lines from top to bottom while writing the lines in from right to left.

Accordingly, the H-scaled (in Step 652) and previously written sub-frame data (Step 653) is then vertically read out from the sub-frame memories (Step 681). As described above, the manner of such vertical reading is done such that a subsequent write process to a full frame memory enables the sub-frames to be re-oriented in a viewable orientation (i.e., de-rotated). For example, if the data is written into the sub-frame in a series of lines from top to bottom while writing the lines in from right to left, a vertical read process can be conducted to generate de-rotated sub-frames. Although there are a number of ways of doing this a method such as described with respect to FIG. 5(*b*) can be used. Here, that means the data can be read out as a stream of short vertical data columns. In one embodiment, the columns can, beginning at the left hand side, be written from top to bottom with the columns being read from left to right.

Then the stream of short vertical data columns are vertically scaled (Step 683) to generate H/V scaled data columns that are not quite correctly oriented.

Then the stream of short H/V scaled data columns are vertically written to the full frame memory (Step 685). To achieve the de-rotation of these H/V scaled columns, they are written to the full frame memory in an "inverted" manner. For example, when read out from the sub-frame memories as described above, they are the columns are written to the full frame memory as a vertically oriented series of data columns written from bottom to top (the opposite of the top to bottom read process of Step 681) and also from right to left (the opposite of the left to right read process of Step 681). In this way, the series of H/V columns are written to the full frame memory in a manner that de-rotates the image data to form a de-rotated H/V scaled full frame.

Sub-frames comprising these H/V scaled columns are then accumulated in a full frame memory until an entire image frame is accumulated in the full frame memory (Step 687).

Accordingly, this now H/V-scaled full frame, is then horizontally read out from the full frame memories (Step 689) and then output for further processing or display (Step 661 of FIG. 661).

General Mode of Operation

Figure 7:
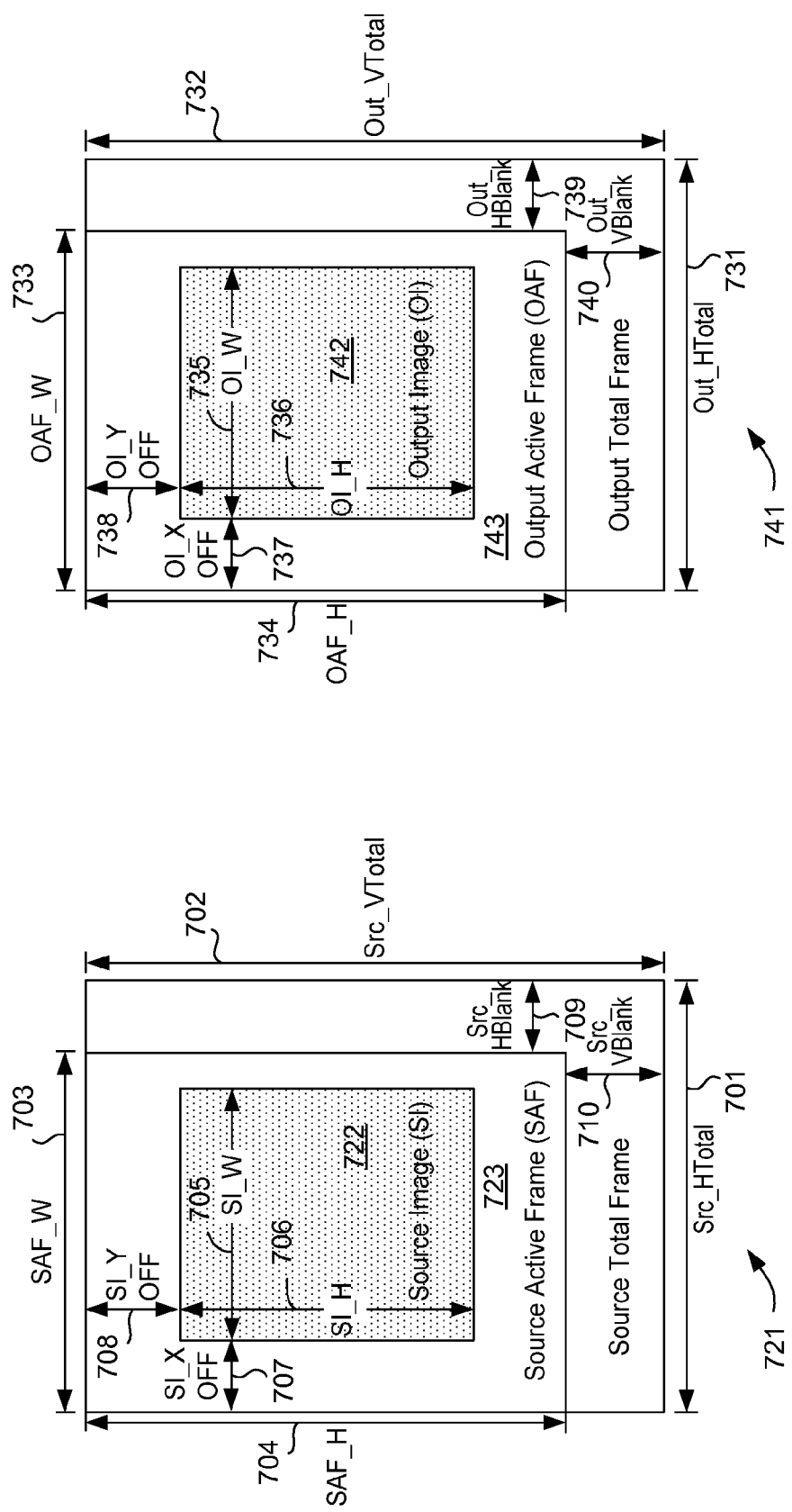
FIG. 7 is a diagram showing one embodiment of a timing diagram relating source image data with output image data.

The following discussion concerns various modes of operation of the adaptor. Additionally, several data processing pathways through the adaptor 303 can be used. To assist, FIG. 7 is provided to illustrate some example relationships between source image formats and output image formats (associated with the sink device) and a relationship to some data processing pathways.

Referring generally to FIG. 3(*a*), a source device 301 is linked with an adaptor 303 to a sink device 302. The adaptor 303 obtains information concerning the capabilities of the source 301 and sink 302 devices. For example, the adaptor can become aware of these capabilities (operating parameters, system capabilities, and other system parameters (parametric information)) by reading by reading EDID information at the adaptor. Many other sources of such parametric information can be provided to or obtained by the adaptor. Based on such information, the systems of adaptor are selectively implemented.

The source device 301 transmits a video stream to the adaptor 303. Additionally, the source video frame format information and other source image parametric information can be received at the adaptor 303. Additionally, the adaptor obtains external display capability information to enable image rendering as an output video frame that can be displayed on an external sink device. An example of some useful device capability information is illustrated below. The specification contemplates further image, source, and display information can be used in accordance with the methods and devices taught herein. Some example parameters include, but are not limited to source and display colorimetry and color bit depth. Also, information concerning output video image rendering orientation relative to original source video image orientation. For example, 0-/90-/180-/270-degree de-rotation angle (0-degree angle meaning no de-rotation).

Using the example timing diagram of FIG. 7 and the Tables below, a number of device capability parameters and information and image information is illustrated.

FIG. 7 refers to a timing diagram describing a relationship between source and output image frames. A source total frame 721 and an associated output total frame 741 are depicted. A source image 722 and source active frame 723 are depicted in relation to the source total frame 721. As are an output image 742 and output active frame 743 (in relation to the output total frame 741). The displayed image data (e.g., 722, 742) comprises a portion of the active frame 723, 743 (which comprises the entire displayable portion of a display media (the "screen")) which comprises a portion of the source total frame 721, 741 which further includes the blanking periods.

This diagram is useful in relating the various timing relationships related to source (input) and output image frames Example Source Frame Video Timing Information Includes:
701 source frame total horizontal width (in pixel count) (Src_H Total);
702 source frame total vertical height (in line count) (Src_V Total);
703 source frame active horizontal width (in pixel count) (SAF_W);
704 source frame active vertical height (in line count) (SAF_H);
705 source frame image width (in pixel count) (SI_W);
706 source frame image height (in line count) (SI_H);
707 source frame image horizontal offset (in pixel count) (SI_XOFF);
708 source frame image vertical offset (in line count) (SI_YOFF);
709 source frame horizontal blanking period (in pixel count) (S_H_Blank);
710 source active frame vertical blanking period (in line count) (S_V_Blank).

Example Output Frame Video Timing Information Includes:
731 output total horizontal frame width (in pixel count) (Out_HTotal);
732 output total vertical frame height (in line count) (Out_VTotal);
733 output active frame horizontal width (in pixel count) (OAF_W);
734 output active frame vertical height (in line count) (OAF_H);
735 output image frame width (in pixel count) (OI_W);
736 output image frame height (in line count) (OI_H);
737 output image frame horizontal offset (in pixel count) (OI_XOFF);
738 output image frame vertical offset (in line count) (OI_YOFF);
739 output active frame horizontal blanking period (in pixel count) (S_H_Blank);
740 output active frame vertical blanking period (in line count) (S_V_Blank).

Also some implementations can make use of additional parametric information including, but not limited to de-interlacing and IVTC, aspect ratio control, digital zoom and pan, brightness and contrast adjustments as well hue/saturation/sharpness/gamma adjustments, frame rate conversion, color point conversion, color space conversion (e.g., Component to RGB or RGB to Component, or conversions between RGB, CMYK, xvYCC, HSL, HSV, as well as many other color spaces, as well as implemented independently configured color gamuts), various noise reduction approaches, detail and edge enhancements, motion compensation, primary and secondary color calibration (including hue/saturation/luminance controls independently for each), as well as other parametric information and video effects.

Figure 8:
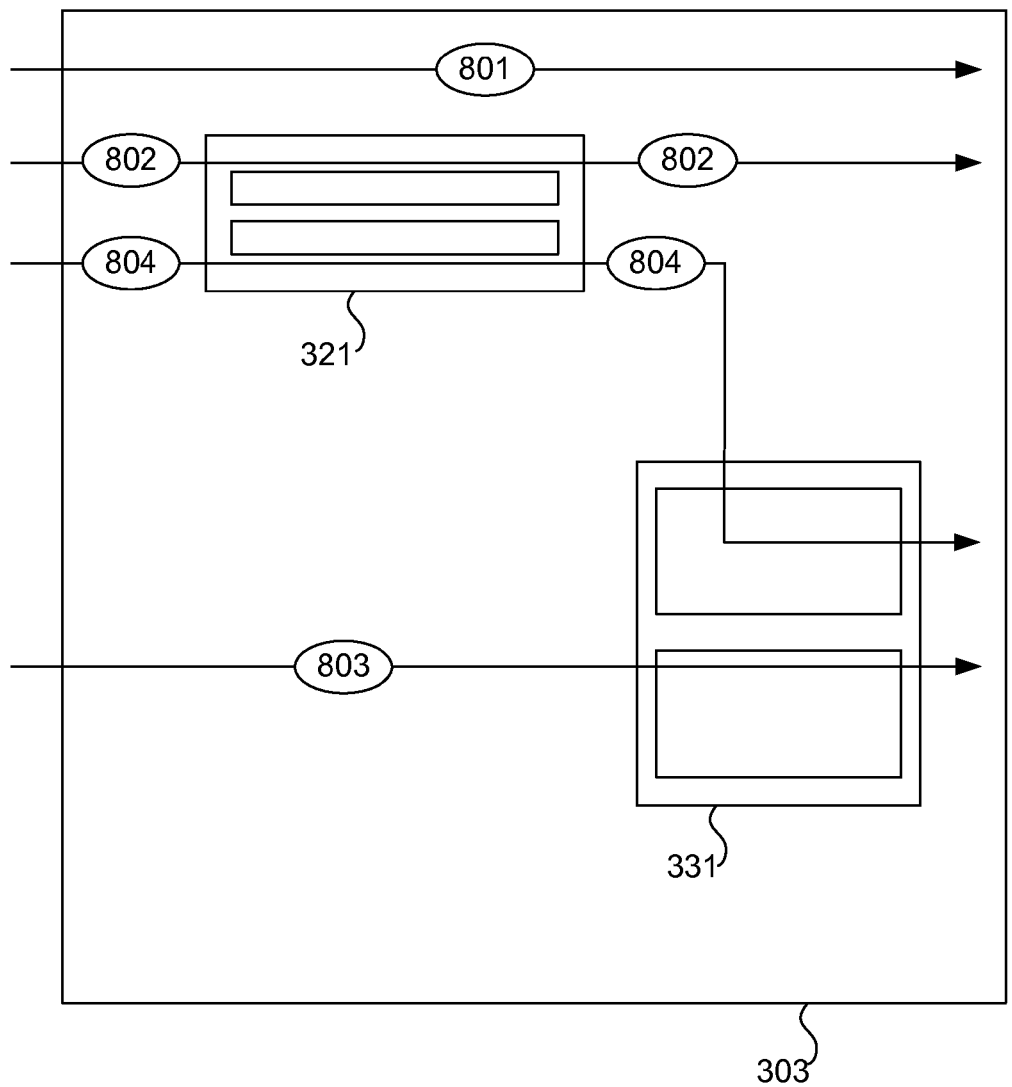
FIG. 8 is a schematic depiction of an adaptor embodiment illustrating some of the possible operational pathways through an adaptor in accordance with an embodiment of the present invention.

FIG. 8 is provided in the form of simplified schematic diagram illustrating different operational paths through an adaptor 303 (similar to that of FIG. 3(b)) and various adaptor systems. For ease of explanation many systems are omitted (e.g., the scalers, interfaces, power supply, controller, etc.) from this illustrative drawing.

In operation, the data can follow a number of paths through the adaptor 303.

In a first path 801, all memory modules (e.g., both sub-frame module 321 and full frame module 331) are bypassed. This is path can be taken when there is no need for de-rotation and no scaling is required. For example, where the following conditions are met:
the de-rotation angle is 0°;
the SI_H (706)=OI_H (736);
the SI_W (705)=OI_W (735);
the Src_HTotal (701)=Out_HTotal (731); and
the Src_VTotal (702)=Out_VTotal (732).

In such a case, the source signal can simply pass through the adaptor 303 and be output to a sink device without substantial processing. Typically where the source image requires no adaptation or reconfiguration to enable display with the sink device 302.

In another case (path 804), both of the memory modules 321, 331 can be employed. This can be path taken, for example, when a de-rotation is performed or where scaling and total frame resizing are performed. For example, when the following conditions are met:
the de-rotation angle≠0°;
And also can be employed when scaling and total frame resizing are performed in accordance with the following conditions:
the SI_H (706)≠OI_H (736); and
the Src_VTotal (702)≠Out_VTotal (732)×(OI_H (736)/SI_H (706)).

In such a case, the source signal can be processed through the sub-frame module 321 and then the full frame module 331 and such scalers as are needed can enable the desired scaling. Particularly, this approach can be utilized to great advantage when the de-rotation is at 90° or 270° (clockwise).

In another case (path 802), the full frame module 331 can be bypassed. Only sub-frame memory module 321 is used. This path can be taken where H-scaling is to be performed and the total output frame size is related to the adjustments (e.g., scaling) in the image height. For example, where the following conditions are met:
the de-rotation angle=0° or 180°;
And also, when the following conditions are met:
the SI_H (706)≠OI_H (736); and
the Out_VTotal (732)=the Src_VTotal (702)×(OI_H (736)/SI_H (706));

In such a case, the source signal can be processed through the sub-frame module 321 and bypass the full frame module 331 implementing such scalers that are required to enable the desired scaling. Particularly, this approach can be utilized to great advantage when the de-rotation is at 0° (as indicated above) and selected scaling operations are to be performed.

Additionally, such a process can be used when de-rotation of a 180° rotated source signal is desired. For example, the data can be output from the sub-frame memories 321 in a "reverse" order from that in which it was written to the sub-frame memories 321. For example, as discussed above, when written into the sub-frame memories from top to bottom and from right to left, the data can be written to a full frame memory from bottom to top and also from left to right thereby reorienting the image such that it is de-rotated.

In another approach, path 803 indicates a process where the sub-frame module 321 can be bypassed. This can be employed where no de-rotation is to be performed and where the image itself needs no resizing. For example, where the following conditions are met:

the de-rotation angle=0°;

And also, when total frame resizing is to be performed without image resizing in accordance with the following conditions:

the SI_H (706)=OI_H (736);

the SI_V (705)=OI_V (735); but where the total frame is resized the Out_VTotal (732)≠the Src_VTotal (702)×(OI_H (736)/SI_H (706));

In such a case, the source signal can be processed through the full frame module 331 and bypass the sub-frame module 821 and implement such scalers that are required to enable the desired scaling. This approach is advantageous when the de-rotation is at 0° (as indicated above) and selected resize operations are to be performed.

Additionally, a single source frame can be subject to different routes. For example, where the source image comprises a 720 p image and the sink (e.g., an external display) is configured to render images in a 1080 p format.

In a standard 720 p video format, the source data has the following timing parameters:

a source active frame width (SAF_W) (703)=1280 pixels;

a source active frame height (SAF_H) (704)=720 lines;

a source total frame horizontal width (Src_H Total) (701)= 1650 pixels;

a source total frame vertical height (in line count) (Src_V Total) (702)=750 lines;

and a corresponding 1080 p external display having the following timing parameters:

output active frame horizontal width (OAF_W) (733)=1920 pixels;

output active frame vertical height (OAF_H) (734)=1080 lines;

output total horizontal frame width (Out_HTotal) (731)= 2200 pixels; and output total vertical frame height (Out_VTotal) (732)=1125 lines.

Accordingly, in this example, the original 720 p source image is to scaled up to a 1280 p format. Accordingly, the Ouput_V Total=Src_VTotal (702)×(OI_H (736)/SI_H) provides an Ouput_V Total=1125 lines which only requires an H/V scaling operation. Accordingly, the full frame memories (331) can be bypassed using, for example, path 802.

If the source image is to be centered in the display screen, using a total frame resizing without scaling the image the sub-frame memories 321 can be bypassed using, for example, path 803.

In another example, where it is desirous to scale up the 720 p source image 10% (e.g., to a 1408×792 resolution) the Src_VTotal is scaled up 825 lines to generate a "scaled" image ("scaled_VTotal" or Out_VTotal) (i.e., the source vertical total frame height is scaled up to 750×110%=825 lines). Accordingly, scaled the Src_VTotal≠scaled_VTotal. Thus, horizontal and vertical scaling are performed and the total frame is resized. Thus, path 804 is used passing the data through both the sub-frame memory module 321 and the full frame memory module 331.

Also, as indicated above, de-rotation operations will use both memory module 321, 331.

In another example, a 1080 p source image is forwarded to a 1080 p sink device under conditions where the following timing parameters are prescribed:

the SAF_W (703)=1920 pixels;

the SAF_H (704)=1080 lines;

the Src_H Total (701)=2200 pixels; and the Src_V Total (702)=1125 lines;

similarly, the corresponding 1080 p external display timing parameters the same:

OAF_W (733)=1920 pixels;

OAF_H (734)=1080 lines;

Out_HTotal (731)=2200 pixels; and

Out_VTotal (732)=1125 lines.

Accordingly, when no operations are desired (i.e., where the source frame is forwarded as is) all of memory elements (e.g., modules 321, 331) can be bypassed.

In another situation, where the source image is scaled up, a different approach can be used. In one example, it is desired that a 1800×960 source image (within a larger 1920×1080 source active frame) is to be scaled up for display using the full external display screen. Accordingly, a "Scaled_VTotal" will not be equal to the Out_VTotal. Thus, horizontal and vertical scaling of the source image must be conducted (to scale the smaller source image all the way up to full screen size. Additionally, the total frame must be resized. Accordingly, a path like path 804 is used accommodating both memory modules 821, 831. And as before, de-rotation, used both memory modules 821, 831 as well.

The adaptor systems disclosed herein are efficient. However, when the process is used to switch from one path (801, 802, 803, 804) to another of said paths (801, 802, 803, 804) certain discontinuities in image representation can occur. These switches can cause signal timing discontinuity. Such can cause an undesirable flickering of images. In one aspect, the invention disclosed methods of reducing the flicker caused by such.

Timing Concerns and Adjustments

When measured in pixel count (horizontal direction) and line count (vertical direction), an output video frame may be larger than, smaller than, or equal to the source video frame, depending on whether the image is scaled up/down.

When observed in a time domain (e.g., using FIG. 10 as an example), a Source Vertical Period and an Output Vertical Period are the same as long as no vertical frame rate conversion operation is performed by the de-rotating adaptor. The difference between Src_VTotal and Out_VTotal is accompanied by a compensating change in the timing of the associated Src_H_Period and Out_H_Period.

However, when modes of adaptor operation are changed or timing changed between source and sink image frames occur the adaptor can be configured to adjust to these as well. For example where a small frame delay occurs the adaptor compensates.

For example, where a process switches from an all memory bypass process (path 801 of FIG. 8) to a process using full frame module 331 (e.g., paths like 803 and 804 of FIG. 8) the change to implementation full frame module 331 use induces at least a single frame delay. However, the adaptor controller can receive a status change message (e.g., a stop or start image de-rotation message (or others) enabling the controller to adjust the manner in which the adaptor process image frames. For example, to accommodate a full frame delay a most recent full frame can simply be repeated to cover the introduction of the one frame delay. In a reverse situation, where the image frames are being processed by the full frame memory module 331 and then begin a full frame memory bypass process (path 801), a frame can be deleted to resynchronize the source and output frames such there is no apparent delay.

It is pointed out that selectively bypassing sub-frame and/or full frame memory modules 321, 331 can lead to power savings. This means that path switching may occur when a source video frame to output video frame operation changes even if the source video frame and output video frame remain constant.

Adaptor operations can also be used to process source video frames to generate output video frames have their own inherent source to output delays. Additionally, such timing effects can include partial frame delays or frame shortening.

For example, when partial frame timing effects result in a partial frame delay, a first approach can be used. For instance, when image scaling is performed. Such as when bypass images (e.g., path 801) are changed to enable horizontal and/or vertical scaling (H/V scaling), a partial frame delay can be introduced. In one embodiment, the delay can be a source line delay equal to or more that the number of V-scaling filter tap count divided by 2. For example, an 8-tap vertical scaler filter can introduce a delay of 4 source lines. Also, when a total frame is resized, without resizing the image (i.e., path 803) delays can also be introduced. In one approach, the delay can be compensated for by shortening the vertical blanking periods (Out_VBlank 740) of the output image frames until the image frames are adjusted for the delays introduced by mode transitions (i.e., changes of paths). These vertical blanking periods can then be slowly returned to normal over a few following frames enabling image viewing without noticeable distortions.

In contrast, in a case where the timing change comprises a shortening of the frame period (e.g., where a process using a sub-frame memory then begins a sub-frame bypass process (for example where a path 802 process is altered to a 801 process), a partial frame shortening can be introduced. In one embodiment, the source line shortening can be equal to number of data rows of a sub-frame memory. For example, an 8 row sub-frame can introduce a shortening of 8 source lines. In one approach, the shortening can be compensated for by lengthening the vertical blanking periods (Out_VBlank 740) of the output image frames. This can generate a small black border that can be output to the external sink device. However, this does not result in substantial viewable effects. As above, the vertical blanking periods can then be slowly returned to normal over a few following frames (here, by slowly lengthening the vertical blanking periods).

It should be pointed out that various partial frame timing effects and solutions can be combined with full frame effects.

These comprise several of the many embodiments disclosed herein. In addition, embodiments of the present invention further relate to integrated circuits and chips (including system on a chip (SOC)) and/or chip sets that can be incorporated into adaptors of a type described herein or other devices. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. Such can include tangible non-transitory computer readable implementations. Such computer readable code can be embodied in adaptor devices of a type described herein. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of conforming a source image frame associated with a source device for rendering by a sink device, the method comprising the operations of:
    in an adaptor configured to couple the source device and the sink device, receiving a source image frame from the source device;
    determining based on a physical orientation of the source device whether the source image frame is to be modified to enable compatibility with the sink device;
    generating an output image frame by performing at least one of scaling or de-rotating the source image frame or maintaining the source image frame in an original format; and
    transmitting the output image frame to the sink device.

2. The method recited in claim 1 wherein determining whether the source image frame is to be modified is based on source image frame parameters and sink device parameters;
    generating an output image frame includes:
        selecting an operational path through at least one of: two horizontal scalers, a vertical scaler, a sub-frame memory module, a full frame memory module, or a bypass path; and
        processing the source image frame through the selected operational path to generate the output image frame in a desired format.

3. The method recited in claim 2 wherein processing the source image frame comprises at least one of scaling or de-rotating the source image or maintaining the source image frame in an original format.

4. The method recited in claim 2 wherein selecting the operational path comprises changing from a first operational path to another operational path.

5. The method recited in claim 4 wherein selecting the operational path comprises changing the operational path from a first operational path to another operational path.

6. The method recited in claim 5,
wherein changing the operational path introduces a time delay; and
wherein the method includes compensating for the time delay.

7. The method recited in claim 6 wherein compensating for the time delay comprises at least one of dropping output image frames or repeating output image frames or changing a vertical blanking period output image frames.

8. The method recited in claim 6 wherein the operations are implemented as a set of computer readable instructions stored on a non-transitory computer readable media.

9. The method recited in claim 8 wherein the set of computer readable instructions are implemented as firmware forming a part of the adaptor.

10. An integrated circuit (IC) system for receiving image data from a source device that supports image frame rotation and enables selective de-rotation of source image frames such that the source image frames can be output to and rendered in a de-rotated form by a sink device, the IC system comprising:
a sub-frame processing module enabling storage of portions of input source image frames as image sub-frames and enabling the output of the sub-frames;
a full frame memory module enabling the receipt and accumulation of the image sub-frames to generate a full image frame for output, wherein the full image frame is based on a physical orientation of the source device; and
a control system configured to control the operation of the IC system.

11. The IC system of claim 10 wherein the IC system is configured to receive rotated source image frames, and wherein:
the sub-frame processing module enables output of de-rotated sub-frames;
the full frame memory module enables the receipt and accumulation of the de-rotated sub-frames to generate a de-rotated full image frame for output.

12. The IC system of claim 10 wherein the sub-frame processing module comprises SRAM sub-frame memory elements and the full frame memory module comprises DRAM full frame memory elements.

13. The IC system of claim 10 wherein;
the sub-frame processing module includes two sub-frame memory elements that are configured to store a portion of an input source image frame; and
the full frame memory module includes two full frame memory elements each sized to store the entire image frame.

14. The IC system of claim 13 wherein;
the two sub-frame memory elements of the sub-frame processing module are configured to enable high speed data access in both a first axis and a second axis; and
the two full frame memory elements of the full frame memory module are configured to enable high speed data access in only the first axis and a lower speed data access in the second axis.

15. The IC system of claim 13 wherein;
the two sub-frame memory elements of the sub-frame processing module comprise SRAM memory devices; and
the two full frame memory elements of the full frame memory module comprise DRAM memory devices.

16. The IC system of claim 11 wherein the sub-frame processing module comprises two sub-frame memory elements configured to enable portions of a rotated source input image frame to be stored as image sub-frames by horizontally writing the sub-frames into the sub-frame memories and vertically reading out the sub-frames to generate de-rotated sub-frames.

17. The IC system of claim 16 wherein the full frame processing module is configured to receive the de-rotated sub-frames and accumulate the de-rotated sub-frames as de-rotated full frames.

18. The IC system of claim 11 configured as one or more integrated circuits arranged in a system-on-a chip configuration.

19. The IC system of claim 18 wherein the system-on-a chip is arranged in a housing to form an adaptor device.

20. The IC system of claim 11 wherein the control system is configured to receive source device and sink device capability information enabling the system to format the source image frames for use with the sink device.

21. The IC system of claim 11 further including at least two scalers arranged to enable vertical and H-scaling of image data.

22. The IC system of claim 11 wherein the at least two scalers are arranged to scale at least one of received image frames, image sub-frames or image full frames.

23. The IC system of claim 22 wherein the at least two scalers comprise a first horizontal scaler and a second horizontal scaler each arranged to enable vertical and H-scaling.

24. The IC system of claim 22 wherein the at least two scalers comprise a first horizontal scaler, a second horizontal scaler, and a third vertical scaler arranged to scale at least one of received image frames, image sub-frames or image full frames to generate horizontally and vertically scaled full image frames.

25. The IC system of claim 21 wherein the control system is configured to implement data transmission paths by selectively directing source image frames through IC system components comprising the sub-frame module, the full frame module, selected scalers, a portion of said components, or none of said components.

26. The IC system of claim 25 wherein the control system is configured to implement timing adjustments when data transmission paths are change from one data path to another.

27. A method of adapting image data received from a source device that supports image frame rotation and selectively de-rotating source image frames such that the source image frames can be rendered in a de-rotated form by a sink device, the method comprising;
determining whether a source image frame received from a source device comprises a rotated image frame, based on a physical orientation of the source device;
where the source image comprises a rotated image frame, de-rotating the frame to generate a de-rotated image frame; and
transmitting the de-rotated image frame to the sink device.

28. The method recited in claim 27 further comprising horizontally and vertically scaling the de-rotated image before said transmitting.

29. The method recited in claim 27 wherein de-rotating the frame to generate a de-rotated image frame comprises,
generating a plurality of sub-frames associated with the rotated image frame wherein each sub-frame comprises a portion of the rotated image;
horizontally writing each sub-frame into a SRAM sub-frame memory;

vertically reading out the sub-frame from the SRAM sub-frame memory to generate a plurality of de-rotated sub-frames;

horizontally writing each de-rotated sub-frame into a DRAM memory in a vertical strip; and accumulating the plurality of de-rotated sub-frames in the DRAM memory until an entire de-rotated image full frame formed.

30. The method recited in claim 28 wherein de-rotating and scaling the frame to generate a de-rotated and scaled image frame comprises, generating a plurality of sub-frames associated with the rotated image frame wherein each sub-frame comprises a portion of the rotated image;

performing a first H-scaling of each sub-frame;

horizontally writing each horizontally scaled sub-frame into a SRAM sub-frame memory;

vertically reading out the horizontally scaled sub-frame from the SRAM sub-frame memory to generate a plurality of de-rotated sub-frames;

horizontally writing each de-rotated sub-frame into a DRAM memory in a vertical strip transposing the first H-scaling into V-scaling; and accumulating the plurality of de-rotated and vertically scaled sub-frames in the DRAM memory until an entire de-rotated and vertically scaled image full frame is formed.

31. The method recited in claim 30 further include horizontally reading out the image full frame from the DRAM memory to the scaler.

* * * * *